(12) United States Patent
Nishi

(10) Patent No.: US 7,542,398 B2
(45) Date of Patent: ***Jun. 2, 2009

(54) ABERRATION CORRECTING ELEMENT IN THE OPTICAL HEAD OF A RECORDING AND REPRODUCTION SYSTEM USING INDEPENDENT CONTROL OF PHASE DISTRIBUTION AND DEFOCUS PATTERN VARIABLES

(75) Inventor: Noriaki Nishi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/760,326

(22) Filed: Jun. 8, 2007

(65) Prior Publication Data

US 2007/0230295 A1 Oct. 4, 2007

Related U.S. Application Data

(62) Division of application No. 10/275,751, filed as application No. PCT/JP02/02312 on Mar. 12, 2002, now Pat. No. 7,403,454.

(30) Foreign Application Priority Data

Mar. 12, 2001 (JP) ............................... 2001-68555

(51) Int. Cl.
*G11B 7/00* (2006.01)
(52) U.S. Cl. ................................. 369/112.02
(58) Field of Classification Search ............ 369/112.02, 369/44.23
See application file for complete search history.

(56) References Cited

U.S. PATENT DOCUMENTS 5,793,735 A 8/1998 Oono
5,936,923 A 8/1999 Ootaki et al.

(Continued)

FOREIGN PATENT DOCUMENTS

EP 0 537 904 A2 4/1993

(Continued)

OTHER PUBLICATIONS

S. Ohtaki et al.: "The applications of a liquid crystal panel for the 15 CBYTE optical disk systems" Japanese Journal of Applied Physics, vol. 38, No. 3B, pp. 1744-1749, Mar. 1999.

*Primary Examiner*—Joseph Feild
*Assistant Examiner*—Joseph Haley
(74) *Attorney, Agent, or Firm*—Oblon, Spivak, McClelland, Maier & Neustadt, P.C.

(57) ABSTRACT

Even in the case where there is used technique such as "high NA", "multi-layer recording", etc., in order to carry out optimum correction of wave front aberration produced thereby with a simple technique, such an aberration correcting element to vary variable A and variable B (A≠B) of phase distribution formula $A(-r^4)-B(-r^2)$ as phase correction pattern by aberration correcting element is realized by using a liquid crystal element (30). The liquid crystal element (30) forms such an electrode pattern to generate phase distribution corresponding to spherical aberration at one transparent electrode (31A), and forms such an electrode pattern to generate defocus pattern at the other transparent electrode (31B). In addition, by controlling applied voltages with respect to these electrodes, it becomes possible to independently carry out variable control of the above-described variables A and B.

4 Claims, 18 Drawing Sheets

U.S. PATENT DOCUMENTS

| | | | |
|---|---|---|---|
| 6,094,305 A | 7/2000 | Shiraishi | |
| 6,151,154 A | 11/2000 | Ogasawara et al. | |
| 6,172,957 B1 | 1/2001 | Ogasawara | |
| 6,584,058 B1 * | 6/2003 | Yoshikawa et al. | 369/112.02 |
| 6,937,381 B2 * | 8/2005 | Kitamura et al. | 359/279 |
| 7,012,876 B2 | 3/2006 | Hendriks et al. | |
| 2002/0024688 A1 * | 2/2002 | Ogasawara et al. | 359/16 |

FOREIGN PATENT DOCUMENTS

| | | |
|---|---|---|
| JP | 9-128785 | 5/1997 |
| JP | 9-251657 | 9/1997 |
| JP | 10-20263 | 1/1998 |
| JP | 10-269611 | 10/1998 |
| JP | 2000-11388 | 1/2000 |
| JP | 2000-40237 | 2/2000 |

* cited by examiner

ABERRATION CORRECTING ELEMENT IN THE OPTICAL HEAD OF A RECORDING AND REPRODUCTION SYSTEM USING INDEPENDENT CONTROL OF PHASE DISTRIBUTION AND DEFOCUS PATTERN VARIABLES

CROSS-REFERENCE TO RELATED APPLICATIONS

This application is a divisional of and claims the benefit of priority under 35 U.S.C. §120 for U.S. Ser. No. 10/275,751, filed Apr. 27, 2004, which is the National Stage of PCT/JP02/02312 filed Mar. 12, 2002. All of these applications claim the benefit of priority under 35 U.S.C. § 119 from Japanese Patent Application No. 2001-68555, filed on Mar. 12, 2001. The entire contents of each of these documents are incorporated herein by reference.

TECHNICAL FIELD

This invention relates to an optical head for carrying out, e.g., at least one of recording and reproduction of light signal, an optical apparatus provided with such an optical head, and an aberration correcting element used in such optical head.

BACKGROUND ART

In recent years, realization of high recording density and/or large recording capacity of optical recording media represented by optical disc is being advanced. For example, there has been put to practical use "DVD (Digital Versatile Disc: a Trade Name)" (hereinafter referred to as DVD)" in which disc having the same diameter as that of "CD (Compact Disc: Trade Name (hereinafter referred to as CD)" where, e.g., object lens (objective) numerical aperture (NA) of the optical pick-up unit is 0.45, wavelength of a beam (laser beam) for signal read-out is 780 nm, disc transmission base thickness (which refers to thickness of light transmission layer provided on recording layer of optical disc) is 1.2 mm and recording capacity is about 650 MB is used, object lens (objective) numerical aperture (NA) of optical pick-up unit is caused to be 0.60, wavelength of a beam (laser beam) for signal read-out is caused to be 650 nm, disc transmission base thickness is caused to be 0.6 mm, and recording capacity is enhanced to 4.7 GB which is about seven times greater than that of CD.

Further, in this DVD, in order to approximately double recording capacity, two-layer recording in which two layers are provided at spacing of several ten µm is also realized.

As a technology which serves as key in realization of high recording density and large recording capacity as stated above, there are "high NA" of object lens (objective) and "multi-layer recording" in the optical recording medium.

However, in realization of "high NA" or "multi-layer recording", there take place problems as described below.

First, according as numerical aperture (NA) of the object lens (objective) becomes greater, spherical aberration produced by deviation quantity Δt from reference value of disc transmission base thickness increases in proportion to fourth power of numerical aperture (NA). Namely, quantity produced of spherical aberration is indicated as below.

$$[\text{Spherical aberration}] \propto \Delta t \{(n^2-1)/n^3\} NA^4/\lambda$$

In the above formula, n is refractive index of disc base, and λ is wavelength of a beam (laser beam) for signal read-out. Namely, as understood from the above formula, according as "high NA" is realized, error quantity tolerated with respect to the disc transmission base thickness is remarkably decreased.

Here, when ratios of deviation quantities Δt from the reference value tolerated with respect to the disc transmission base thickness when quantity produced of spherical aberration is assumed to be constant in connection with three cases of the above-described CD and DVD, and comparative example in which further high density is assumed where "numerical aperture (NA)=0.85 and a beam wavelength=405 nm" are calculated, there are obtained results as described below.

When Δt at CD (NA=0.45, λ=780 nm) is assumed to be 1, Δt at DVD (NA=0.60, λ=650 nm) is equal to 0.264, and Δt at the comparative example (NA=0.85, λ=405 nm) is equal to 0.0409.

Tolerable deviation quantity Δt from the reference value is 0.264 times at DVD with respect to CD, and is 0.155 times at the comparative example with respect to DVD. Namely, it is understood that tolerable deviation quantity Δt from the reference value is decreased to so far as about ¹⁄₂₅ as compared to CD in the condition of the comparative example.

In addition, in the "multi-layer recording" as effective system of realization of high recording capacity, plural layers different in the disc transmission base thickness are intentionally provided in a stacked manner. For this reason, quantities produced of spherical aberration at the convergent point become different values every respective layers.

When attempt is made to carry out "high NA" or "multi-layer recording", etc. in order to realize high recording density and large recording capacity as stated above, characteristic degradation based on increase in spherical aberration produced resulting from error of the disc transmission base thickness becomes problem also in both cases.

On the contrary, e.g., as disclosed in the Japanese Patent Application Laid Open No. 269611/1998 publication, there is proposed a technique for forming spherical aberration correction pattern by using liquid crystal panel, as shown in FIG. 1, in order that there result optimum aberrations every respective layers in carrying out "multi-layer recording" to carry out aberration correction.

In this FIG. 1, the abscissa indicates radial position in the case where normalization is made so that radius in the correcting element for a beam converged onto the recording layer of the optical recording medium becomes equal to 1, and the ordinate indicates phase change quantity given to a beam by the aberration correcting element.

Moreover, FIG. 2 shows phase change quantity given to a beam for signal read-out by the aberration correcting element in a manner classified into phase change quantity for correction of spherical aberration and phase change quantity for defocus correction, wherein the abscissa indicates radial position in the case where normalization is made so that radius at the correcting element for the beam converged onto the recording layer of the optical recording medium becomes equal to 1, and the ordinate indicates phase change quantity given to the beam by the aberration correcting element.

There exists the relationship that when difference between two phase change quantities shown in this FIG. 2 is taken, pattern of phase change quantity as shown in FIG. 1 is obtained When attempt is made to give only phase change quantity for correction of spherical aberration to the beam by the correcting element without including phase change quantity for defocus correction, its phase difference becomes large. For this reason, phase change quantity is given in the state including phase change quantity for defocus correction.

Namely, the phase distribution shown in FIG. 1 corresponds to the distribution obtained by taking difference between phase distribution ($-r^4$) corresponding to spherical aberration and defocus pattern ($-r^2$) separately shown in FIG. 2, and is frequently used in carrying out aberration analysis, etc. in an ordinary sense.

FIG. 3A is an explanatory view showing the procedure in the case where both focus bias value and spherical aberration correction quantity that the aberration correcting element gives are optimized by using the phase distribution shown in FIG. 1. Here, FIG. 3A represents signal characteristic by contour line, wherein the ordinate indicates phase correction quantity that the aberration correcting element gives, and the abscissa indicates focus bias value. In addition, FIG. 3B is an explanatory view showing change of spherical aberration quantity and defocus quantity adjusted by the phase correction quantity and the focus bias value shown in FIG. 3A by using the coordinate axis intelligibly modified, wherein the ordinate indicates spherical aberration quantity and the abscissa indicates defocus quantity.

Here, in the case where liquid crystal panel is used as an aberration correcting element 4 and there is employed a configuration to correct spherical aberration by aberration correction pattern as shown in FIG. 1 as disclosed in the Japanese Patent Application Laid Open No. 269611/1998 publication, problems as described below take place.

It is to be noted that phase distribution close to the pattern shown in FIG. 1 is caused to be generated in a pseudo manner by step-shaped pattern based on division of electrode pattern in the Japanese Patent Application Laid Open No. 269611/1998 publication. On the other hand, even if such step-shaped pattern is not employed, technology for generating continuous phase distribution is announced in, e.g., "4p-K-1 of proceedings of academic lecture meeting of autumn society of applied physics, 2000" or "CPM 2000-91 (2000-09) "Technical Research Report of Institute of Electronics and Communication Engineers of Japan" Society of Electronic Information and Communication", etc. In this technology, electrodes positioned at the inner circumferential side and the outer circumferential side of the liquid crystal panel are used to generate electric field in a direction along the principal surface in place of thickness direction of the panel to form potential gradient in the direction of the panel surface within the liquid crystal layer. However, even if such a liquid crystal panel which generates continuous phase distribution is used as the aberration correcting element, problem as described below similarly takes place.

Namely, in the optical recording medium using object lens (objective) of "high NA" or "multi-layer recording", etc., in the case where the signal characteristic is optimized, it is necessary to optimize both focus bias value and spherical aberration correction quantity by the liquid crystal.

However, in the case where attempt is made to carry out such optimization by using the aberration correction pattern of FIG. 1, it can be confirmed that the signal characteristic when focus bias value and correction quantity by liquid crystal are changed results in contour line distribution as shown in FIG. 3A.

Accordingly, in the case where adjustment is carried out from the "initial position" toward the "best position" in the figure, if "setting of focus bias" and "setting of liquid crystal correction quantity" are not alternatively repeated many times, it is impossible to follow up so that there results the "best position".

This not only allows the adjustment to be complicated, but also leads to the fact that adjustment is converged into the point which is not the "best position" by a little factor.

This can be considered in a manner as described below.

For the purpose of simplifying the explanation, the signal characteristic with respect to defocus quantity and spherical aberration is assumed to be a characteristic as shown in FIG. 3B. Here, as the signal characteristic, amplitude of RF signal or jitter of RF signal, etc. may be used.

As described above, by first changing "focus bias", it is possible to adjust "defocus quantity" without affecting "spherical aberration".

However, "spherical aberration" can be corrected by "phase control by liquid crystal", and, on the other hand, gives change also to formation of light spot on a light detecting element for forming focus error signal and intensity distribution by "phase change by liquid crystal" produced when spherical aberration quantity is controlled. For this reason, followed by "phase control by liquid crystal", "focus bias" where signal characteristic becomes satisfactory would change (In practice, the best image surface position where the signal characteristic becomes best also somewhat changes by "spherical aberration control".

Accordingly, in the case where the "focus bias" is caused to be constant, and the "spherical aberration quantity" is caused to be changed, defocus quantity also changes followed by change of "spherical aberration quantity". However, phase distribution corresponding to essential aberration required in correcting spherical aberration produced by error of the disc transparent base thickness is only the phase distribution ($-r^4$) corresponding to the spherical aberration.

Further, change of aberration quantity in the case where the phase distribution shown in FIG. 1 is used to carry out aberration correction can be expressed in a manner described below by using variable C.

$$[\text{Pattern } 0] = C\{(-r^4) - (-r^2)\} \tag{1}$$

Conventional adjustment can be expressed as the case where it is assumed that this variable C is changed.

Namely, in the conventional correction, the phase distribution shown in FIG. 1 is collectively changed in the ordinate direction by variable C.

As stated above, in the case where correction is made by using aberration correction pattern disclosed in this Japanese Patent Application Laid Open No. 269611/1998, there was the problem that adjustment of correction quantity becomes complicated.

DISCLOSURE OF THE INVENTION

In view of the above, an object of this invention is to provide an aberration correcting element in which even in the case where technique such as "high NA" or "multi-layer recording", etc. is used for the purpose of realization of high recording density or large recording capacity, it can correct, in an optimum manner, wave front aberration (mainly spherical aberration) produced thereby with a simple technique, an optical head using such an aberration correcting element, and an optical apparatus using such an optical head.

To attain the above-mentioned object, an optical head according to this invention is directed to an optical head for carrying out at least one of recording and reproduction of an information signal with respect to an optical recording medium including a light transmission layer on a recording layer where the information signal is recorded, the optical head comprising: a light source for emitting a beam; converging means for converging the beam onto the recording layer of the optical recording medium; light detecting means for detecting a reflected beam converged onto the recording layer of the optical recording medium by the converging means and reflected by the recording layer; and aberration correcting means provided on an optical path extending from the light source to the converging means for controlling, by an arbitrary pattern, spherical aberration and defocus of the beam converged onto the recording layer of the optical recording medium.

Moreover, an optical apparatus according to this invention is directed to an optical apparatus for carrying out at least one of recording and reproduction of an information signal with respect to an optical recording medium including a light transmission layer on a recording layer where the information signal is recorded, the optical apparatus comprising: an optical head for irradiating a beam with respect to the optical recording medium and for detecting a reflected beam from the recording layer of this optical recording medium, a servo circuit for controlling the optical head on the basis of a light detection signal outputted from this optical head, and a signal processing circuit for processing the light detection signal outputted from the optical head, wherein the optical head includes a light source for emitting a beam, converging means for converging the beam onto the recording layer of the optical recording medium, light detecting means for detecting the reflected beam converged onto the recording layer of the optical recording medium by the converging means and reflected by this recording layer, and aberration correcting means disposed on an optical path extending from the light source to the converging means and for controlling, by an arbitrary pattern, spherical aberration and defocus of the beam converged onto the recording layer of the optical recording medium.

Further, an aberration correcting element according to this invention is directed to an aberration correcting element which can be disposed on an optical path within an optical head for carrying out at least one of recording and reproduction of an information signal with respect to an optical recording medium including a light transmission layer on a recording layer where the information signal is recorded, wherein when radius of beam spot of the beam converged onto the recording layer is r and variables different from each other are A, B, the transmitted beam is caused to generate phase distribution indicated by the following phase distribution formula:

$$A(-r^4)-B(-r^2).$$

In the optical head of this invention, aberration correcting means for controlling, by an arbitrary pattern, spherical aberration and defocus of the beam with respect to the recording layer of the optical recording medium is provided on the optical path extending from the light source to the converging means. Thus, even in the case where there is employed technique such as "high NA" or "multi-layer recording", etc. for realization of high recording density and/or large recording capacity, it becomes possible to correct, in an optimum manner, wave front aberration (mainly spherical aberration) produced thereby with a simple technique.

Moreover, in the optical apparatus of this invention, aberration correcting means for controlling, by an arbitrary pattern, spherical aberration and defocus of the beam with respect to the recording layer of the optical recording medium is provided on the optical path extending from the light source to the converging means. Thus, even in the case where there is employed technique such as "high NA" or "multi-layer recording", etc. for realization of high recording density and/or large recording capacity, etc., it becomes possible to correct, in an optimum manner, wave front aberration (mainly spherical aberration) produced thereby with a simple technique.

Further, in the aberration correcting element of this invention, when radius of beam spot of the beam converged onto the recording layer, and variables different from each other are A, B, the transmitted beam is caused to generate phase distribution indicated by the following phase distribution formula:

$$A(-r^4)-B(-r^2).$$

Thus, even in the case where there is employed technique such as "high NA" or "multi-layer recording", etc. for realization of high recording density and/or large recording capacity in the optical head or the optical apparatus, it becomes possible to correct, in an optimum manner, wave front aberration (mainly spherical aberration) produced thereby with a simple technique.

BRIEF DESCRIPTION OF THE DRAWINGS

In FIG. 13B, K=1.25; In FIG. 13C, K=1.5).

BEST MODE FOR CARRYING OUT THE INVENTION

Best modes for carrying out an optical head, an optical apparatus and an aberration correcting element according to this invention will now be described in detail on the basis of attached drawings.

It is to be noted that best modes which will be explained below are preferred embodiments of this invention, and technically preferable various restrictions are attached, but the scape of this invention is not limited to these embodiments as long as there does not exist the description to the effect that this invention is particularly limited in the following description. Namely, while rotationally operated optical disc is used as the optical recording medium in the following best modes, various media may be used without being limited to the optical disc as this optical recording medium. In addition, while the optical apparatus of this invention is constituted, in the following best modes, as an apparatus which carries out recording and reproduction of an information signal with respect to the optical recording medium, the optical apparatus of this invention may be constituted as a recording apparatus which carries out only recording of the information signal with respect to the optical recording medium, or a reproducing apparatus which carries out only reproduction of the information signal from the optical recording medium.

Figure 1:
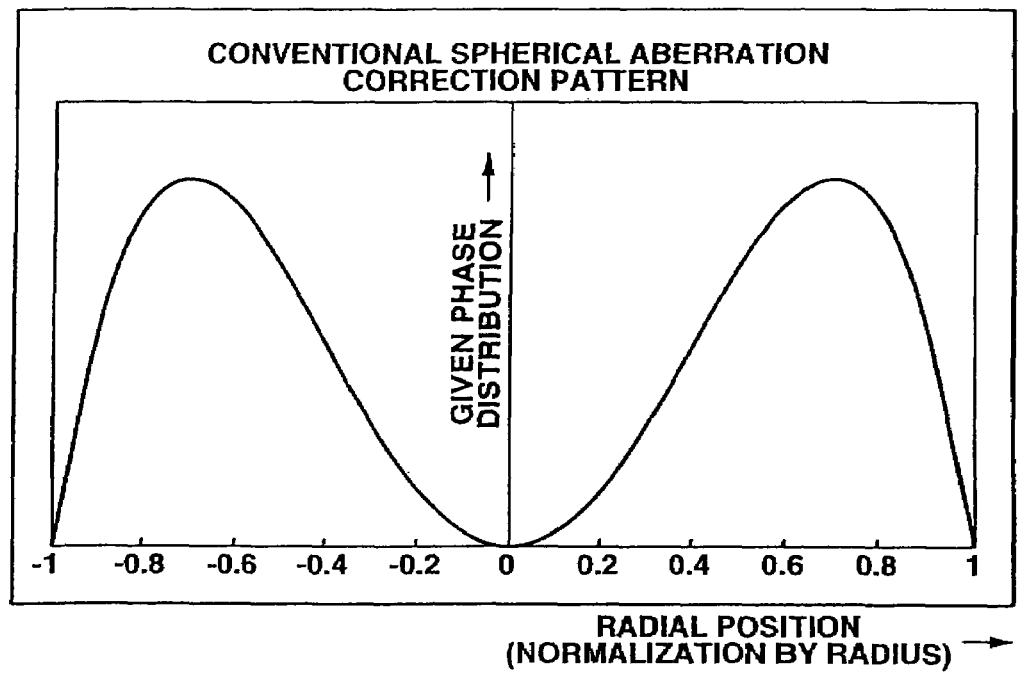
FIG. 1 is an explanatory view showing an example of spherical aberration correction pattern in a conventional aberration correcting element.
Figure 2:
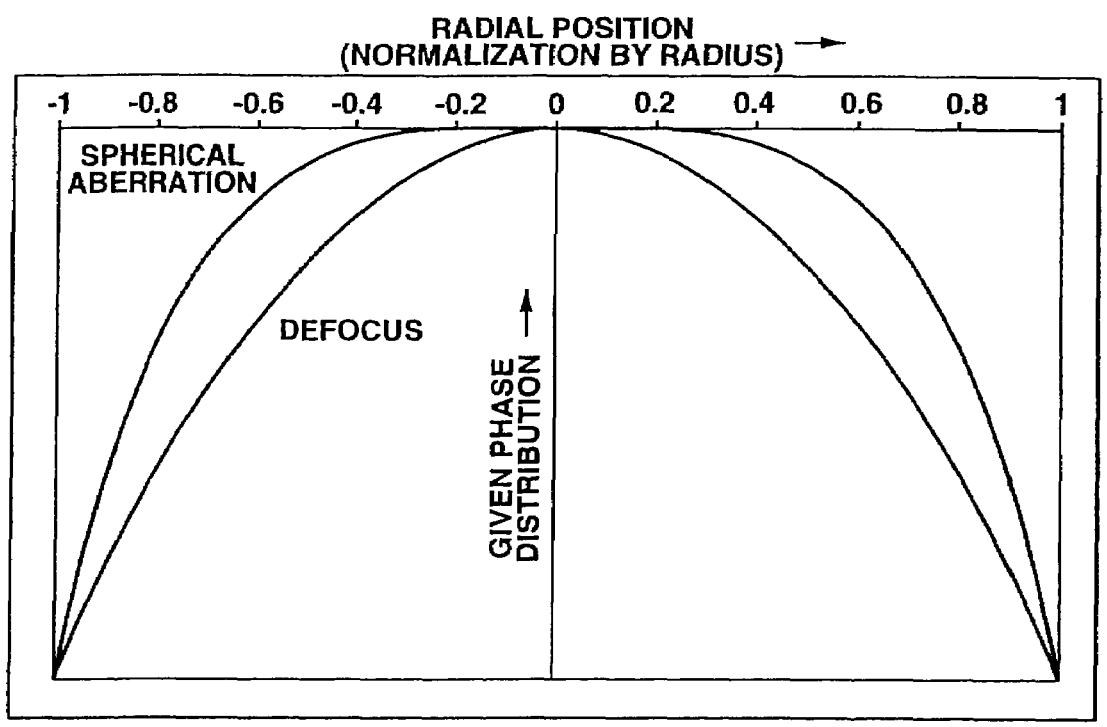
FIG. 2 is an explanatory view showing phase distribution given to a laser beam by the aberration correcting element shown in FIG. 1 in the state classified into phase distribution for spherical aberration correction and phase distribution for defocus correction.
Figure 3A:
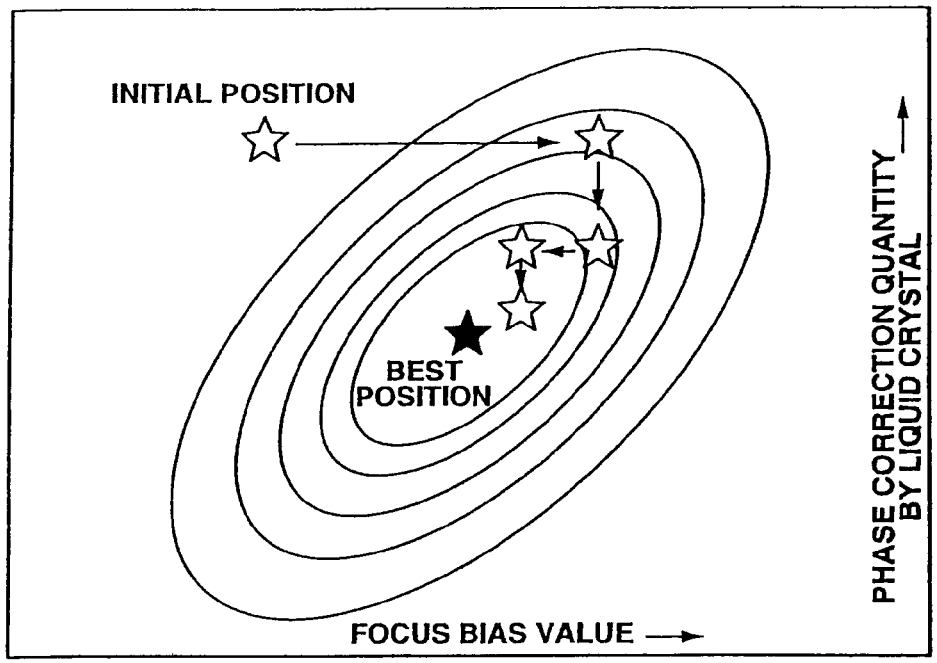
FIGS. 3A and 3B are explanatory views showing procedure in the case where phase correction pattern of the aberration correcting element shown in FIG. 1 is used to optimize both focus bias value and spherical aberration correction quantity of aberration correcting element by liquid crystal element by using the phase correction pattern of the aberration correcting element shown in FIG. 1.
Figure 3B:
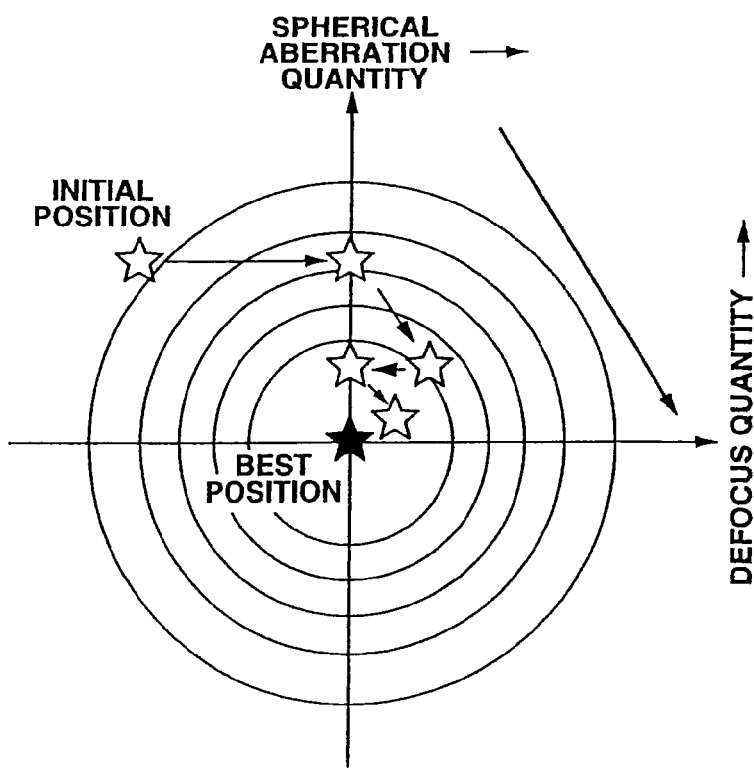
Figure 4:
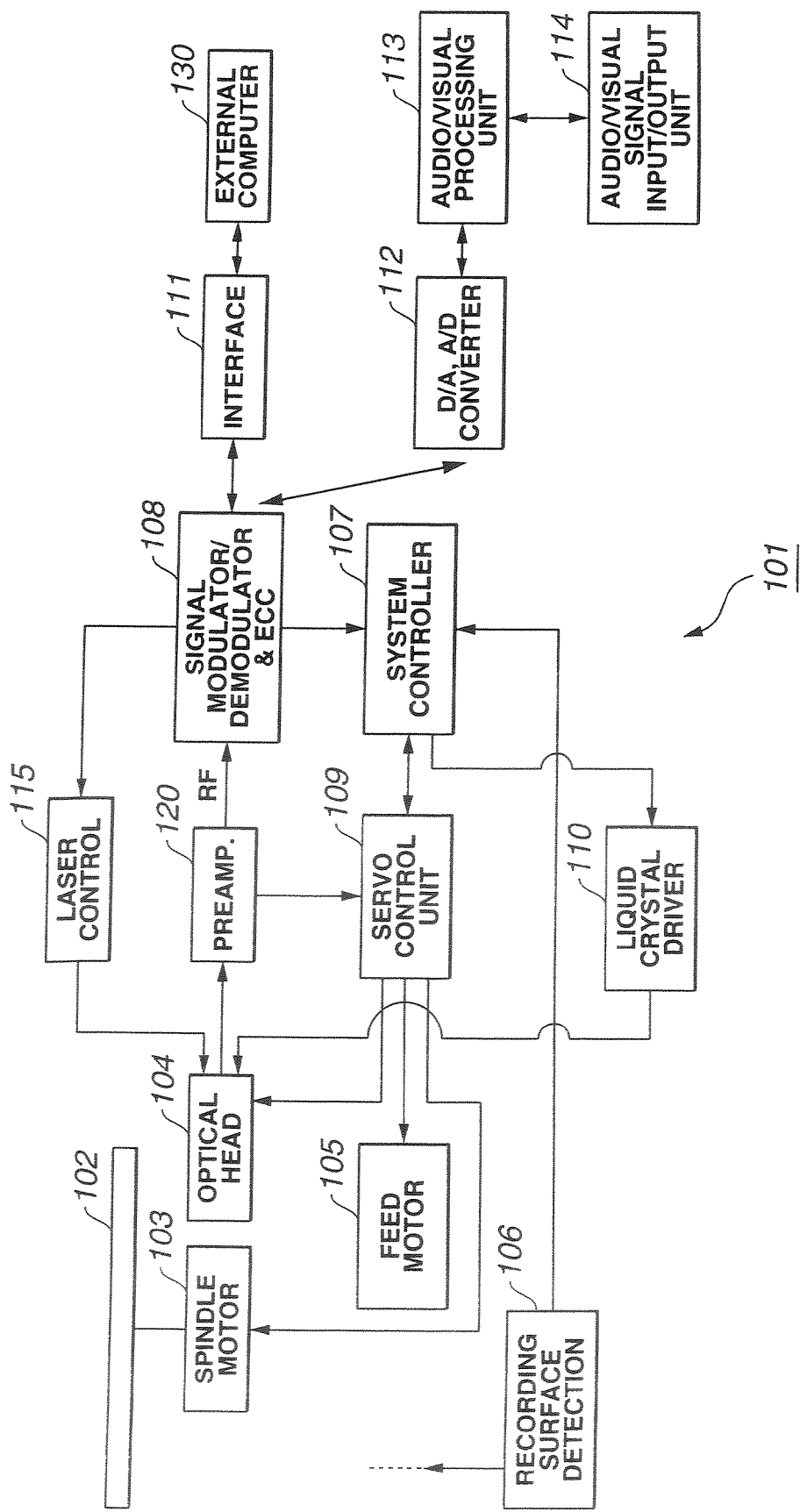
FIG. 4 is a block diagram showing the configuration of an optical apparatus using optical disc in which aberration correcting element and optical head are assembled in the best mode for carrying out this invention.

FIG. 4 is a block diagram showing the configuration of an optical apparatus using optical disc in which an aberration correcting element and an optical head are assembled in the best mode for carrying out this invention. It is to be noted that the optical apparatus using optical disc shown in FIG. 4 is an example of an optical apparatus in which aberration correcting element and optical head which will be described below can be assembled.

This optical apparatus 101 comprises, as shown in FIG. 4, a spindle motor 103 for rotationally driving an optical disc 102, an optical head 104, a feed motor 105 for this optical head 104, and circuit blocks which will be described later.

Here, as the optical disc 102, there may be employed an optical disc which copes with "high NA (Numerical Aperture)" of object lens (objective) or "Multi-layer recording". The spindle motor 103 is caused to undergo drive control by a system controller 107 and a servo control unit 109 so that it is rotated to rotationally operate the optical disc 102.

The optical head 104 respectively carries out light irradiation with respect to the signal recording surface of the rotating optical disc 102 in accordance with commands of the system controller 107 and a signal modulation/demodulation and ECC block 108. By such light irradiation, recording and/or reproduction with respect to the optical disc 102 are carried out. Moreover, this optical head 104 is supported so that movement operation by the feed motor 105 for moving this optical head 104 up to a desired recording track on the optical disc 102 can be carried out.

Further, the optical head 104 detects various beams as described later on the basis of a reflected beam from the signal recording surface of the optical disc 102 to deliver signals corresponding to a respective beam to a pre-amplifier unit 120.

The pre-amplifier unit 120 generates focus error signal, tracking error signal and RF signal, etc. on the basis of signals corresponding to the respective beam to send the RF signal to the signal modulation/demodulation and ECC block 108, and to send respective error signals to the servo control unit 109.

The signal modulation/demodulation and ECC block 108 carries out modulation/demodulation and addition of ECC (Error Correcting Code) of the sent RF signal in accordance with kind of optical disc 102 to be reproduced in dependency upon control of the system controller 107.

The system controller 107 detects kind of loaded optical disc 102 and/or whether or not corresponding recording is multi-layer recording through a recording surface detecting unit 106. Moreover, the system controller 107 controls drive of liquid crystal panel serving as an aberration correcting element provided at the optical head 104 through a liquid crystal driver 110.

The recording surface detecting unit 106 detects surface reflection factor and/or other difference in shape or outer appearance of optical disc 102, etc. to thereby detect recording system/kind of loaded optical disc 102, and/or relative linear velocity between the recording surface and the beam, etc., and to detect either one of divided recording areas in the case where the recording area of this optical disc 102 is divided, or either one of stacked recording surfaces in the case where this optical disc 102 has plural stacked recording surfaces.

Moreover, the servo control unit 109 controls the spindle motor 103, the optical head 104 and the feed motor 105 in accordance with sent respective error signals. Namely, control of the spindle motor 103, control of the feed motor 105 and controls in focussing direction and in tracking direction of the biaxial actuator which holds object lens (objective) of the optical head 104 are respectively carried out by the servo control unit 109.

For example, if the optical disc 102 is disc for data storage of computer, recording signal demodulated at the signal modulation/demodulation and ECC block 108 is sent out to an external computer 130, etc. through an interface 111. Thus, the external computer 130, etc. can receive, as reproduction signal, signal recorded at the optical disc 102.

Moreover, if the optical disc 102 is audio/visual disc, reproduction signal is caused to undergo digital conversion at D/A converting unit of a D/A, A/D converter 112, and is delivered to an audio/visual processing unit 113. Further, the reproduction signal in which audio/visual signal processing has been implemented at this audio/visual processing unit 113 is transmitted to external audio/visual equipment such as motion picture projector, etc. through an audio/visual signal input/output unit 114.

It is to be noted that it is sufficient that either one of the D/A, A/D converter 112 and the audio/visual processing unit 113 is provided in accordance with use purpose of the optical apparatus, and it is not necessarily required that both units are provided.

Further, in the case of carrying out recording of the information signal with respect to the optical disc 102 by this optical apparatus, signal delivered from the external computer 130, or external audio/visual equipment is sent to the signal modulation/demodulation and ECC block 108 via the interface 111 or the D/A, A/D converter 112. This signal modulation/demodulation and ECC block 108 modulates sent signal in accordance with control of the system controller 107 to control light source of the optical head 104 through a laser control circuit 115 on the basis of the modulated signal. In addition, emission output of the light source of the optical head 104 is modulated. Thus, recording of the information signal with respect to the optical disc 102 is carried out.

Figure 5:
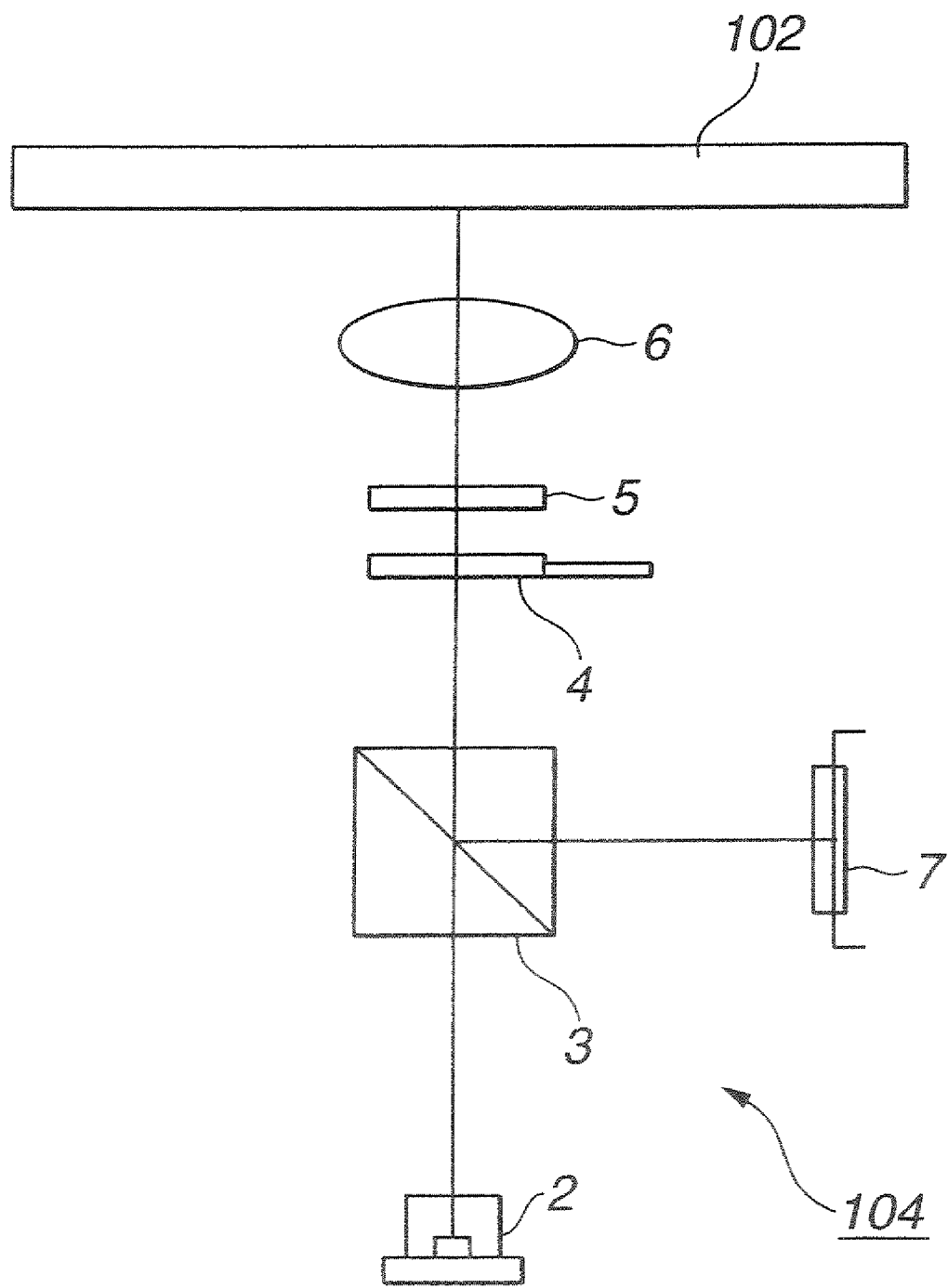
FIG. 5 is an explanatory view showing outline of optical system of the optical head shown in FIG. 4.

The optical head 104 comprises, as shown in FIG. 5, a light source 2, a beam splitter (polarization beam splitter) 3, an aberration correcting element 4, a quarter wavelength plate 5, an object lens (objective) 6, and a light detecting element 7, and is constituted in such a manner that these respective optical parts are individually mounted. As the light source 2, semiconductor laser is used.

In this optical head 104, the beam emitted from the light source 2 is incident on the beam splitter 3, and is transmitted through this reflection surface because such beam is P-polarized light with respect to the reflection surface of this beam splitter 3. Thus, aberration is rendered by the aberration correcting element 4. Further, such beam is transmitted through the quarter wavelength plate 5, and are focused on a certain point on the signal recording surface of the optical disc 102 and are irradiated therefrom.

Numerical aperture NA of the object lens (objective) 6 is caused to be, e.g., 0.65 or more. In addition, the optical disc 102 may be a disc such that at least two recording layers or more are provided as previously described.

The reflected beam from the signal recording surface of the optical disc 102 is transmitted through the object lens (objective) 6, the quarter wavelength plate 5 and the aberration correcting element 4 for a second time, and are incident on the beam splitter 3. Such reflected beam is reflected at this reflection surface because it is S-polarized light with respect to the reflection surface of this beam splitter 3. The reflected beam is branched from the optical path returning to the light source 2, i.e., is separated from beam emitted from the light source 2, and is received by the light detecting element 7.

Further, by using an output signal from this light detecting element. 7, reproduction of signals recorded on the optical disc 102 and generation of respective error signals are carried out. In addition, by the beam irradiated onto the optical disc 102, recording of the information signal with respect to this optical disc 102 is carried out.

Figure 6:
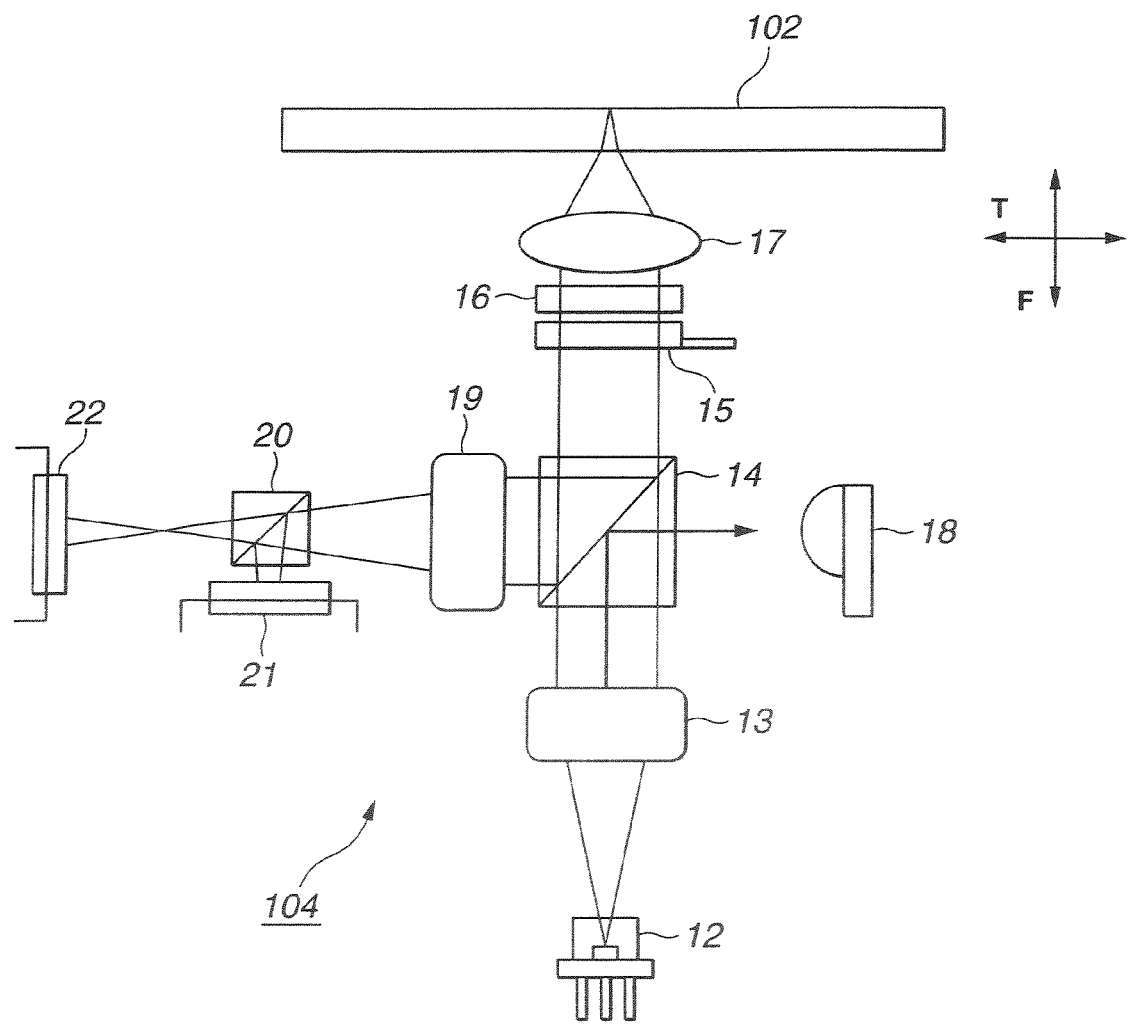
FIG. 6 is an explanatory view showing a little practical example of the configuration of the optical head shown in FIG. 4.

In more practical sense, as shown in FIG. 6, this optical head 104 is caused to be of the configuration comprising a semiconductor laser element 12 serving as a light source, collimator lens 13, 19, a polarization beam splitter 14, a liquid crystal element 15 serving as an aberration correcting element, a quarter wavelength plate 16, an object lens (objective) 17, a light detecting element 18 for FAPC (Front Auto Power Control), a beam splitter 20, and light detecting elements 21, 22.

Namely, in this optical head 104, the beam emitted from the semiconductor laser element 12 is changed into substantially parallel beam by the collimator lens 13, and is incident on the polarization beam splitter 14.

The polarization beam splitter 14 branches the beam emitted from the semiconductor laser element 12 into the beam for monitoring laser light intensity and the beam for carrying out recording or reproduction of signals.

The beam from the semiconductor laser element 12 separated by the polarization beam splitter 14 and transmitted therethrough is caused to undergo rendering of aberration as described above by the liquid crystal element 15 serving as the aberration correcting element of the best mode for carrying out this invention, and are passed through the quarter wavelength plate 16. Thus, such beam is focused on a certain point of the signal recording surface of the optical disc 102 by the object lens (objective) 17, and is irradiated therefrom.

The reflected beam from the signal recording surface of the optical disc 102 is incident for a second time on the polarization beam splitter 14 through the object lens (objective) 17, the quarter wavelength plate 16 and the liquid crystal element 15. The beam which is incident on the polarization beam splitter 14 for a second time is reflected at the reflection surface of this polarization splitter 14, and is incident on the collimator lens 19 so that the focused beam is provided. Such focused beam is branched by the beam splitter 20 so that it is received by a pair of light detecting elements 21, 22 for obtaining a focus error signal by, e.g., the so-called "spot size method", and are received by these light detecting elements 21, 22.

By using output signals from these light detecting elements 21, 22, generation of servo signal including focus error signal and reproduction of signals recorded on the optical disc 102 are carried out.

Further, the aberration correcting element 4 in this best mode gives, to the transmitted beam, phase difference of the pattern represented by the following formula (2) by using variable A and variable B which are different from each other by the notation similar to the previously described formula (1).

$$[\text{Pattern } 1] = A(-r^4) - B(-r^3) \qquad (2)$$

(In the above formula, A≠B)

Further, this aberration correcting element 4 is characterized in that it can change both variable A and variable B or one of them in this formula (2). Such aberration correcting element for changing variable A or variable B can be realized by, e.g., liquid crystal element of the configuration as shown in FIG. 7A.

Figure 7A:
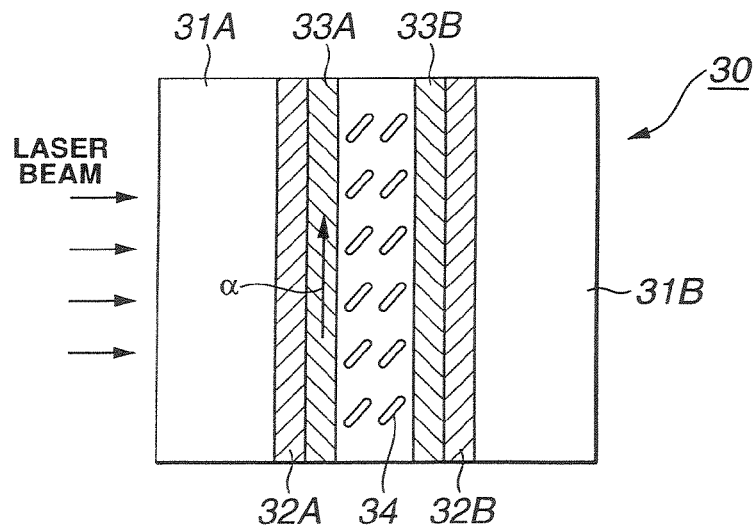
FIGS. 7A, 7B and 7C are explanatory views showing the configuration of liquid crystal element provided at the optical head shown in FIG. 4.

As shown in FIG. 7A, liquid crystal element 30 is caused to be of the configuration in which liquid crystal molecules 34 are sealed between two glass bases (substrates) 31A, 31B. At the insides (surfaces opposite to each other) of the respective glass bases 31A, 31B, transparent electrodes 32A, 32B for applying voltage onto the liquid crystal molecules 34 are provided. In addition, at the insides (surfaces opposite to each other) of the respective transparent electrodes 32A, 32B, orientation films 33A, 33B for giving orientation to the liquid crystal molecules 34 are provided. Here, arrow α in FIG. 7A indicates orientation direction (rubbing direction) of the orientation films 33A, 33B.

In such liquid crystal element 30, in the state where voltage is not applied to the respective transparent electrodes 32A, 32B, liquid crystal molecules 34 are disposed in parallel with the respective orientation films 33A, 33B along the orientation direction given by the respective orientation films 33A, 33B. In addition, when voltage is applied to the respective transparent electrodes 32A, 32B, liquid crystal molecules 34 rise in a direction perpendicular to the respective orientation films 33A, 33B. In this instance, it is possible to control rising angle of liquid crystal molecules 34 by level of applied voltage.

Further, in this best mode, in the aberration correcting element 4 comprised of the liquid crystal element 30, when voltage is applied to the liquid crystal molecules 34 by the electrodes 32A, 32B, refractive index of this liquid crystal molecule layer changes on the basis of applied voltage It is to be noted that respective transparent electrodes 32A, 32B may be formed as divided electrodes as described in the Japanese Patent Application Laid Open No. 269611/1998 to apply different voltages to the divided respective electrodes to control the voltage distribution to thereby control phase distribution given to the transmitted beam. In addition, as described in the previously mentioned "4p-K-1 of proceedings of academic lecture meeting of autumn society of applied physics, 2000" or "CPM 2000-91 (2000-09)" Technical Research Report of Institute of Electronics and Communication Engineers of Japan" Society of Electronic Information and Communication", etc., electrodes positioned at the inner circumferential side and the outer circumferential side of the liquid crystal panel may be formed to produce electric field in a direction along the principal surface in place of thickness direction of the panel to form potential gradient in the panel surface direction within the liquid crystal layer to generate continuous phase distribution.

Figure 7B:
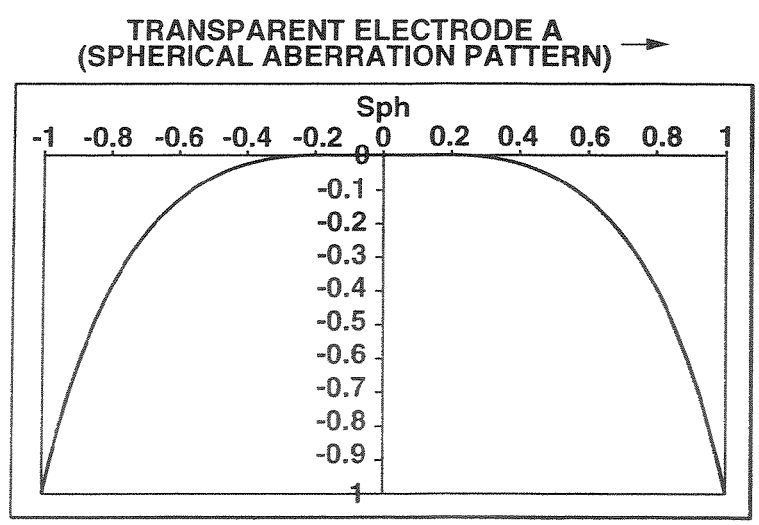
Figure 7C:
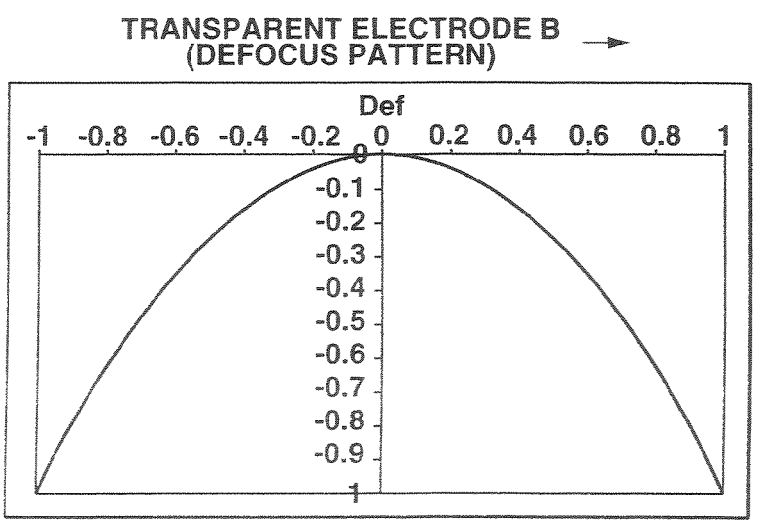

Further, in this best mode, at one transparent electrode 32A, as shown in FIG. 7B, such an electrode pattern to generate phase distribution corresponding to spherical aberration is formed, and at the other transparent electrode 32B, as shown in FIG. 7C, such an electrode pattern to generate defocus pattern is formed. In addition, by controlling applied voltages with respect to these electrodes, it is possible to independently carry out variable control of the above-described variables A and B.

It is to be noted that the aberration correcting element 4 comprised of this liquid crystal element 30 may be disposed in such a manner that the beam from the light source is incident from the side of one transparent electrode 32A, or may be disposed in such a manner that the beam from the light source is incident from the side of the other transparent electrode 32B.

Further, two liquid crystal elements or more may be used in a stacked manner to thereby realize generation of phase distribution as described above.

Further, the example where liquid crystal element is used as the aberration correcting element 4 has been described in this best mode, but the aberration correcting element 4 is not limited to such implementation. The aberration correcting element 4 may be constituted also by using phase change material, e.g., PLZT (ferroelectric, piezoelectric or electro-optical ceramic material consisting of zirconic acid lead titanate lanthanum), etc.

Figure 8:
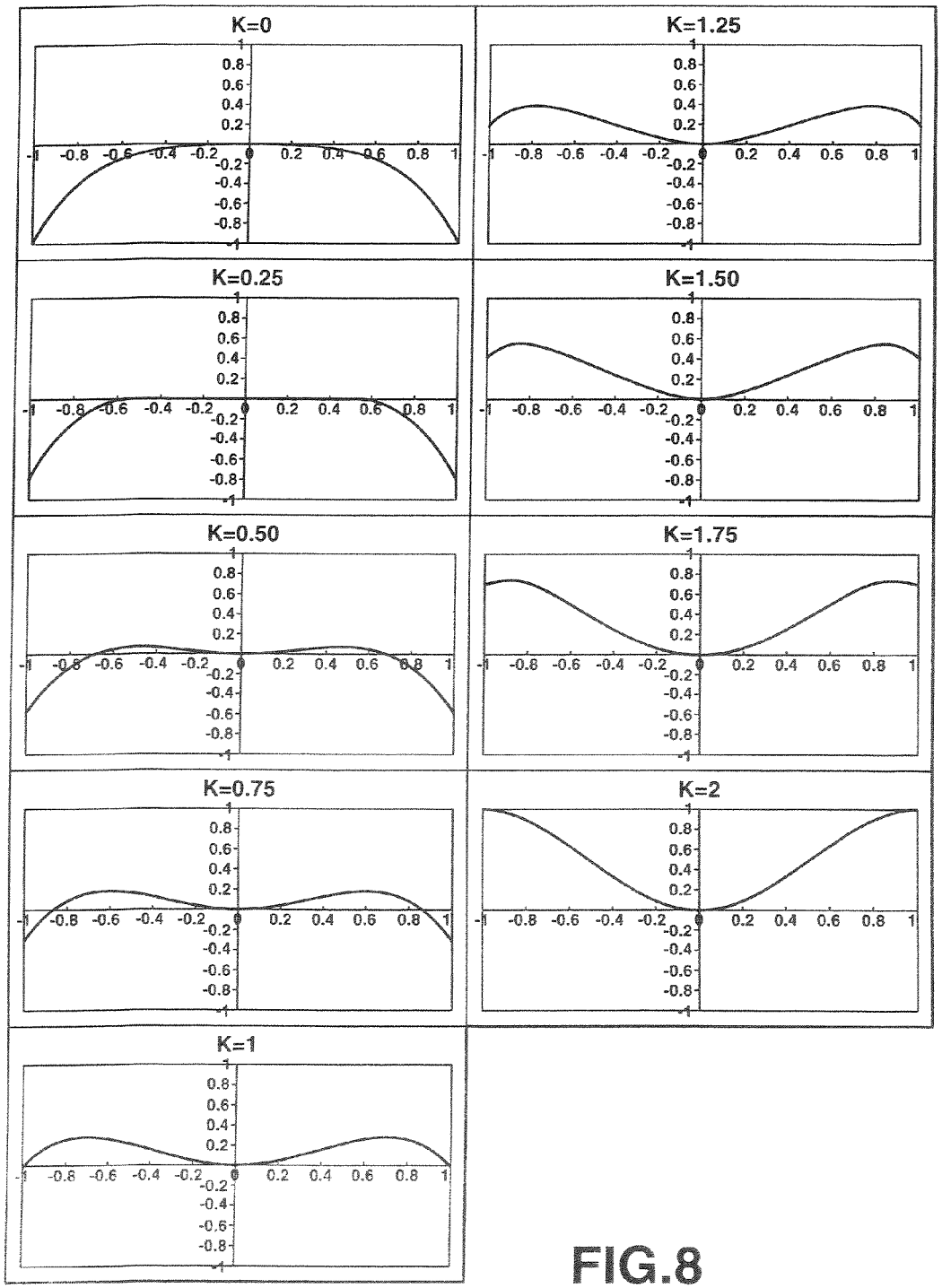
FIG. 8 is an explanatory view showing a more practical example of phase correction pattern which can be generated by using the liquid crystal element shown in FIG. 7.

Further, the phase correction pattern can be diversely changed as mentioned in FIG. 8, for example, by changing ratio between variables A and B. In this case, in FIG. 8, in order to indicate change of pattern shape, the pattern shapes are indicated by changing K (correction ratio) of $$[\text{Pattern 1}] = A\{(-r^4) - K(-r^2)\}$$

in the condition where A=1 and K=B/A.

Figure 9:
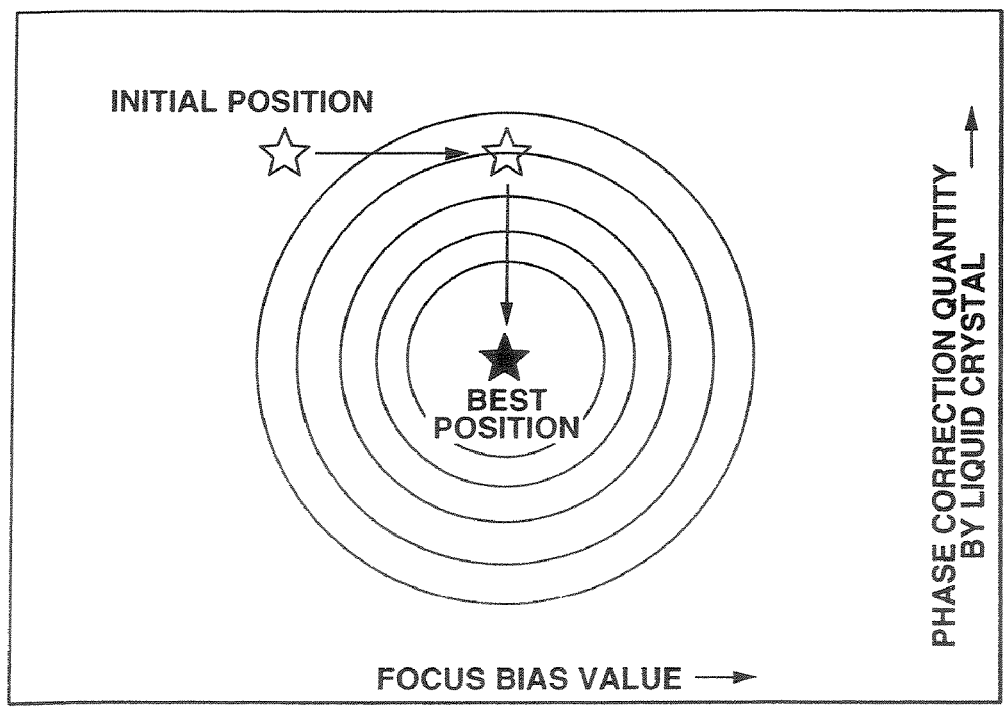
FIG. 9 is an explanatory view showing the procedure in the case where the phase correction pattern shown in FIG. 8 is used to optimize focus bias value and spherical aberration correction quantity.

Further, although the above-described "change of optimum focus bias by spherical aberration correction" changes also in dependency upon the method of forming focus error, if suitable K is selected, distribution of the signal characteristic with respect to the "focus bias value" and "phase correction quantity A" is permitted to be the distribution in which adjustment is easy as shown in FIG. 9. Thus, adjustment procedure from the initial position to the best position can be simplified and can be accurate.

Figure 10:
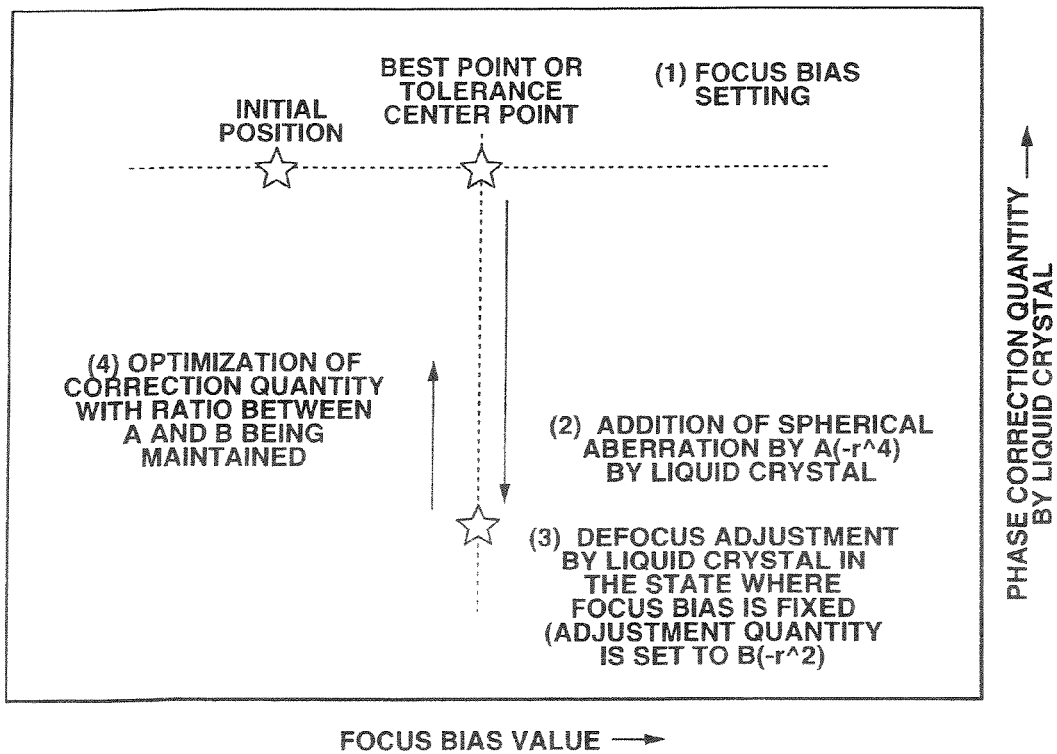
FIG. 10 is an explanatory view showing a technique for determining value of correction ratio K=B/A between phase distribution corresponding to spherical aberration and defocus pattern in the optical head shown in FIG. 4.

The technique for determining value of correction ratio K=B/A between phase distribution corresponding to spherical aberration and defocus pattern will now be briefly described by using FIG. 10. In the state where optical disc is loaded into the optical apparatus to turn ON light source of the optical head, the following operation will be carried out.

(1) First, "focus bias value" is swung (changed) from the initial position to determine best point (or tolerance center point) of the signal characteristic.

(2) Then, aberration correction by the phase distribution corresponding to the spherical aberration is carried out to add spherical aberration by $A(-r^4)$ (It is to be noted that direction of addition is caused to be the direction where signal characteristic is improved).

(3) Then, defocus adjustment quantity by defocus pattern is swung in the state where the spherical aberration quantity and the focus bias value are caused to be constant so that the signal characteristic becomes best in that state (adjustment quantity is $B(-r^2)$).

(4) By the above-mentioned steps, K=B/A is determined. A is changed in the state where this K is kept constant, i.e., voltages of both electrodes of phase distribution corresponding to spherical aberration and defocus pattern are controlled so that the signal characteristic becomes best (or tolerance center).

It is to be noted that while, here, with respect to the case where optimum value of K is unknown, derivation technique thereof has been described, value of this K can be approximately determined if the configurations of the optical disc and the optical head are determined. In that case, aberration correction pattern corresponding to value of desired K may be provided as one transparent electrode of the aberration correcting element (liquid crystal element), and the other transparent electrode may be caused to be fixed electrode (entire electrode). Thus, the number of pins for driving the liquid crystal element can be reduced.

In addition, when aberration correction pattern corresponding to value of desired K is provided at one transparent electrode, and defocus pattern is provided in advance at the other transparent electrode to change defocus value in the state where K is kept constant, only applied voltage of one transparent electrode may be caused to have distribution to use function of defocus pattern of the other transparent electrode as occasion demands.

Optimization of the spherical aberration correction pattern will be further considered below.

When roughly classified, the following two kinds of optimum patterns are conceivable.

(1) Pattern in which "optimization (adjustment) of correction quantity" is easy with respect to a certain optical disc.

(2) Pattern in which FOCUS BIAS is not changed at the time of switching between multi-layer recording layers in the optical disc.

Here, first, consideration will be made in connection with what value optimum correction ratio K between spherical aberration ($r^4$ term) and defocus ($r^2$ term) takes in the case where the positional relationship between object lens (objective) and recording surface of the optical disc is not changed.

[Correction pattern]=$A\{(-r^4)-K(-r^2)\}$

It is to be noted that judgment of the state where the signal characteristic becomes best with respect to changes of spherical aberration and/or defocus, etc. is carried out on the basis of jitter of RF signal, error rate and/or RF signal amplitude, etc. The applicant of this application has experimentally obtained the experiment result that the method in which the state where amplitude of the shortest mark becomes maximum is taken as reference has good sensitivity and has relatively small deviation with respect to the center of margin among these methods. Here, the term called the shortest mark designates 3T mark in, e.g., EFM modulation, and designates 2T mark in (1, 7) modulation.

Figure 11:
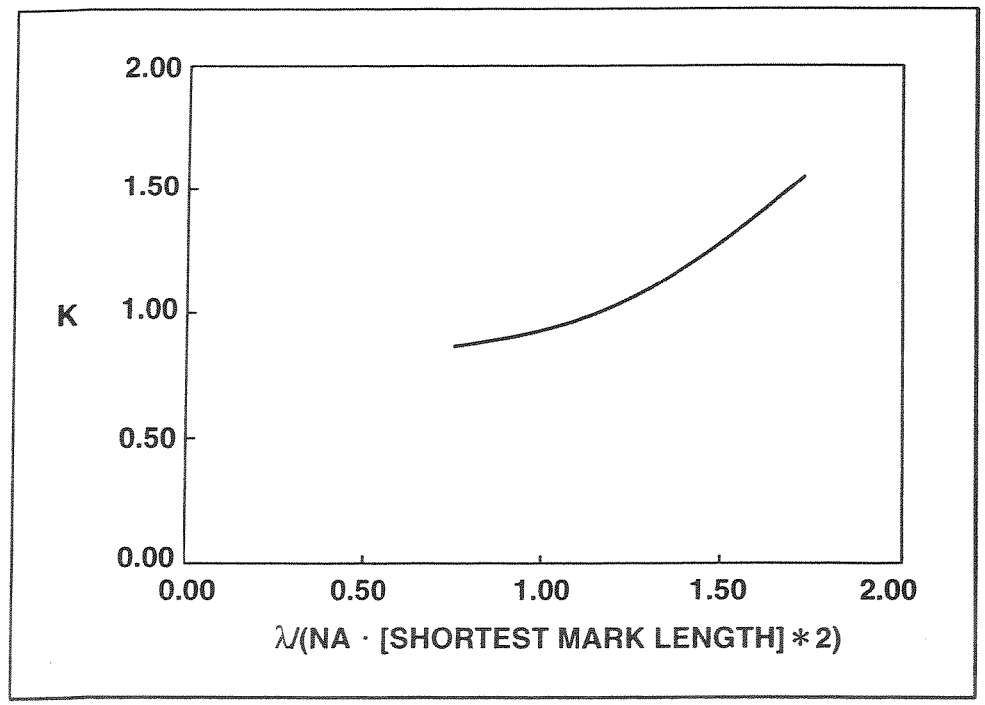
FIG. 11 is a graph showing the relationship between the shortest mark length and correction ratio K in the optical disc.

When [$\lambda$/(NA×[shortest mark length]×2)] is taken as the abscissa and value of optimum K is taken as the ordinate as value which represents the state of diffraction pattern serving as basis of modulation by the shortest mark, it is seen that a predetermined relationship exists there between as shown in FIG. 11.

Here, the optimum K is K where change of the shortest mark amplitude becomes minimum in the case where size is changed and A is changed in the state where shape of pattern is maintained with respect to aberration corresponding to shape of correction pattern in order to correct spherical aberration. Accordingly, when the shortest mark length changes, value of the optimum K would change.

Figure 12:
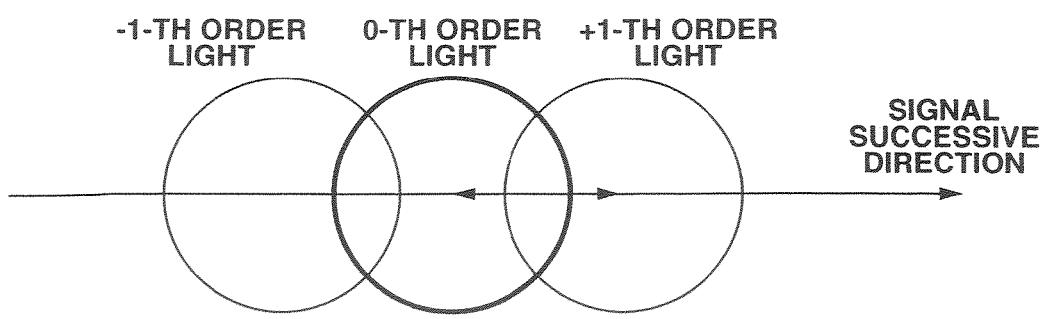
FIG. 12 is a plan view showing the state of a diffracted beam spot by the shortest mark on optical disc.

The trend of the graph shown in FIG. 11 can be interpreted as follows. Namely, according as the shortest mark becomes smaller, value of [$\lambda$/NA×[shortest mark length]×2)] becomes greater, and overlap of the 0-th order light and the ±1-th order light diffracted by succession of the shortest marks results in the area corresponding to the peripheral portion of aperture, i.e., the portion where numerical aperture (NA) of the object lens (objective) is large as shown in FIG. 12.

Figure 13A:
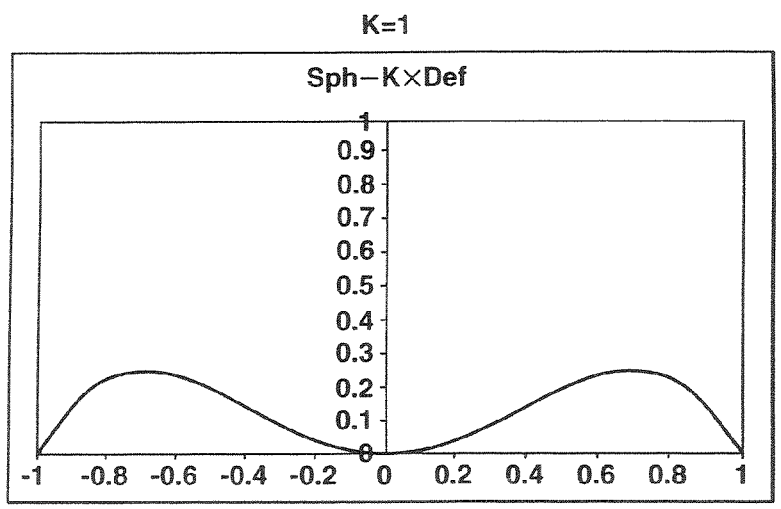
FIGS. 13A, 13B and 13C are graphs showing differences of aberration correction quantities by values of correction ratios K (In FIG. 13A, K=1.
Figure 13B:
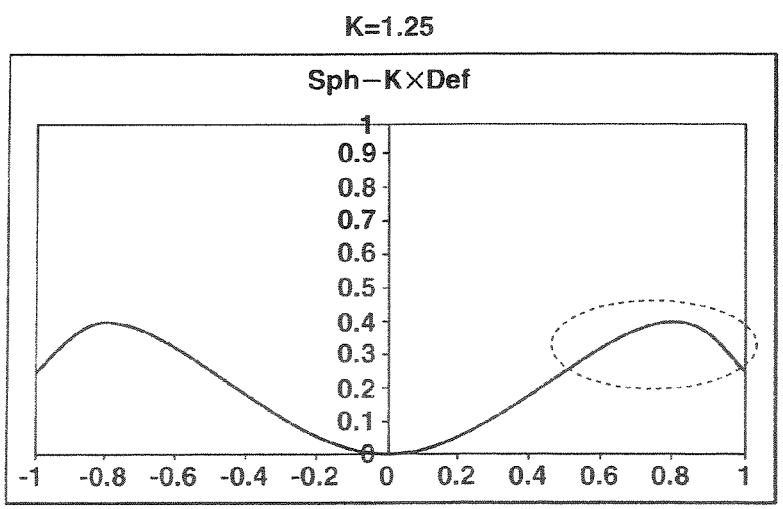
Figure 13C:
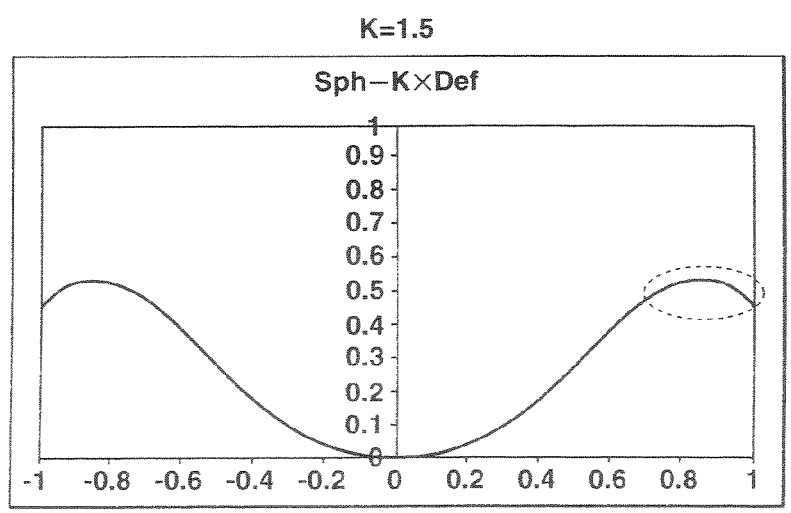

On the other hand, when K becomes great, the portion close to the portion where phase distribution is flat shifts to the area corresponding to the portion where numerical aperture (NA) is large as shown in FIGS. 13A, 13B and 13C. FIG. 13A shows the phase distribution in the beam radius direction where K=1, FIG. 13B shows the phase distribution in the beam radius direction where K=1.25, and FIG. 13C shows the phase distribution in the beam radius direction where K=1.5.

Accordingly, it can be interpreted that it is the condition of optimum K that there results a phase distribution such that the position where rays of light of the area which contributes to the shortest mark are converged is not changed so much by the aberration correction.

In practice, because focus error is also changed by change of aberration in return light, the above-mentioned value of optimum K is not in correspondence with the above-described "K which simplifies adjustment of aberration correction".

In this case, in the optical head for "DVD (Digital Versatile Disc)", value of optimum K is about 1.35. Further, in the optical head for optical disc of which density is caused to be higher than DVD, value of optimum K becomes greater according as the above-described shortest mark becomes smaller. Namely, it can be said that, in the optical head for optical disc equivalent to DVD, or caused to have higher density, value of optimum K is value more than 1.

Figure 14:
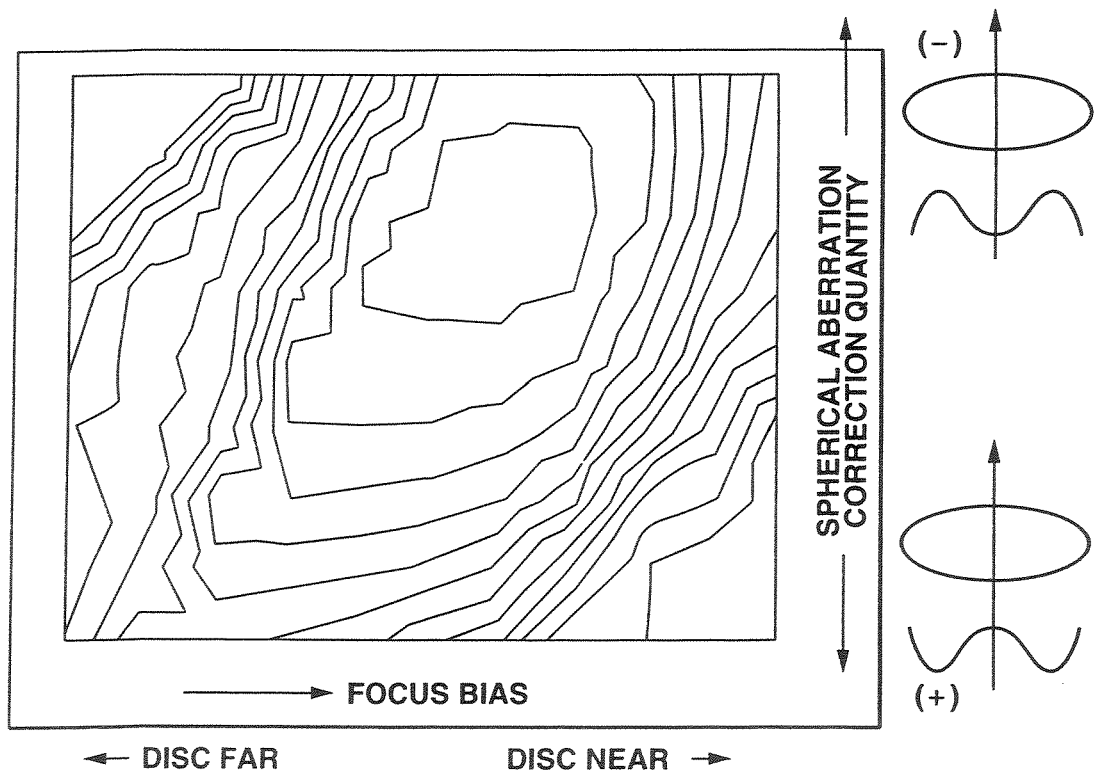
FIG. 14 is a graph showing the relationship of spherical aberration correction quantity, focus bias and signal characteristic.

Here, in the system of the shortest mark length in which the optimum K becomes equal to 1.15 in the above-described reference, the result in the case where aberration correction is carried out by using liquid crustal element of K=1 is indicated. When spherical aberration correction quantity at this time is taken as the ordinate and focus bias is taken as the abscissa, the signal characteristic can be represented by contour line as shown in FIG. 14. In the case where there is carried out spherical aberration correction of (+) of quantity in which defocus effect by ($r^2$) term is changed by 1 μm, the optimum focus bias was shifted to the side away from the optical disc (Disc Far) by quantity corresponding to 0.15 μm. In this case, employment of an approach to allow K to be equal to 0.85 means that focus bias deviation is cancelled. This point can be interpreted as follows.

Figure 15:
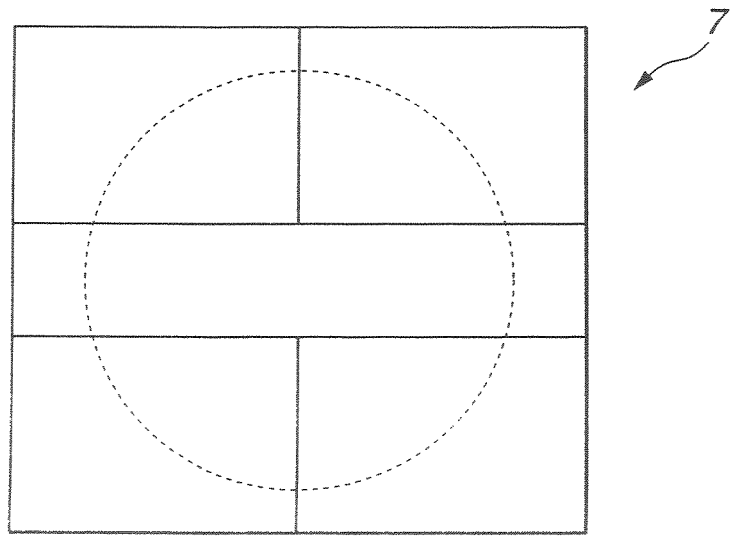
FIG. 15 is a front view showing shape of light receiving surface of light detector in optical head.

Namely, in this experiment, detection of focus error signal was carried out by the system of detecting focus error signal by the so-called "astigmatism method" in which a light detector having divided light receiving surfaces at the central portion is used as shown in FIG. 15 to use only light received at four light receiving surfaces of the peripheral side in the state where light received at the central portion is not used for focus error detection (the system shown in the Japanese Patent Application No. 277544/1999 that the applicant of this application has already proposed (Japanese Patent Application Laid Open No. 101681/2001) (U.S. patent application Ser. No. 09/671,103, U.S. Application Date: Sep. 27, 2000, Title "Optical Head, Light Detecting Element, Light Information Recording/Reproducing Apparatus and Focal Point Error Detection Method". For this reason, the beam of the portion where numerical aperture (NA) is small (hereinafter referred to as "low NA light" hardly contribute to change of focus error signal, and return in-focus position of the beam of the portion where numerical aperture (NA) is great (hereinafter referred to as "high NA light") is dominant with respect to change of focus error signal.

Figure 16A:
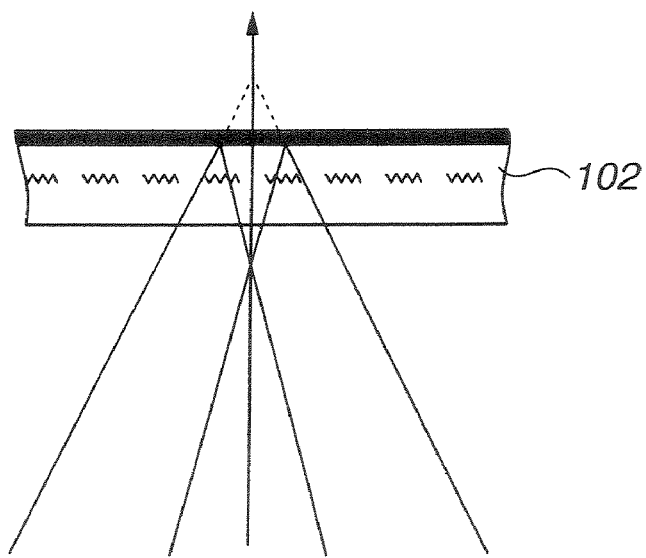
FIGS. 16A and 16B are side views showing the states of an incident beam (FIG. 16A) and a reflected beam (FIG. 16B) with respect to optical disc when spherical aberration correction is made toward the (−) side in the system where degree of contribution of high NA light with respect to focus error signal is high.
Figure 16B:
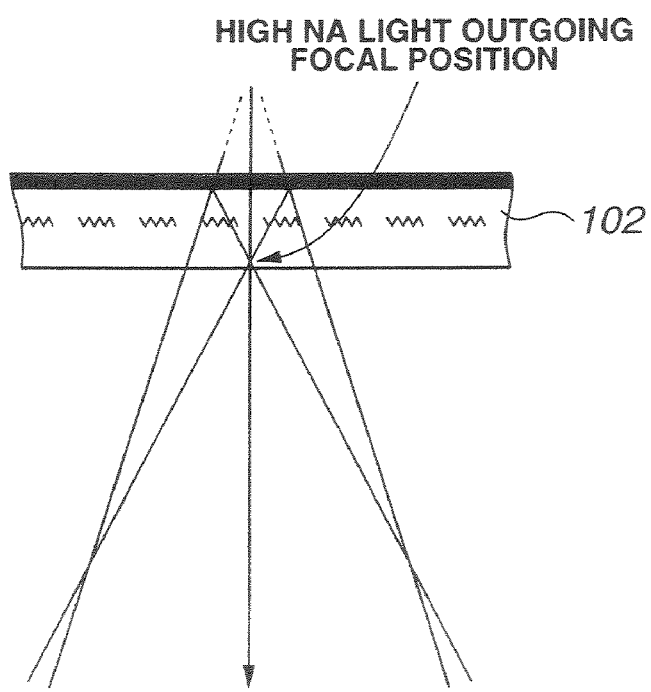
Figure 17A:
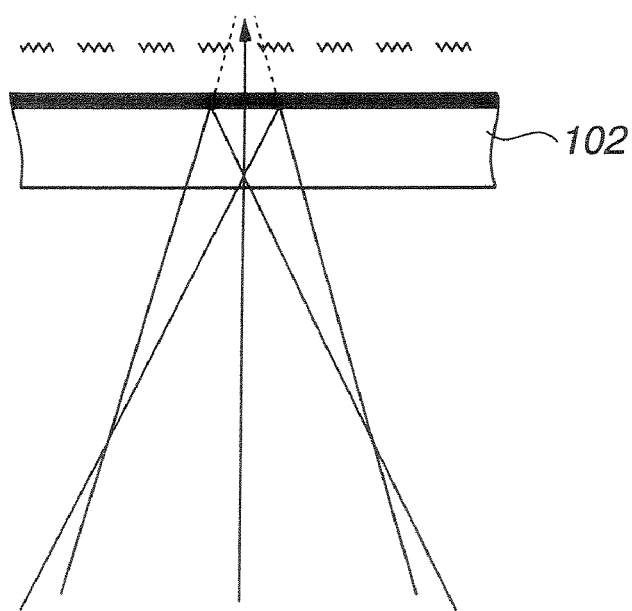
FIGS. 17A and 17B are side views showing the states of an incident beam (FIG. 17A) and a reflected beam (FIG. 17B) with respect to optical disc when spherical aberration correction is made toward the (+) side in the system where degree of contribution of high NA light with respect to focus error signal is high.
Figure 17B:
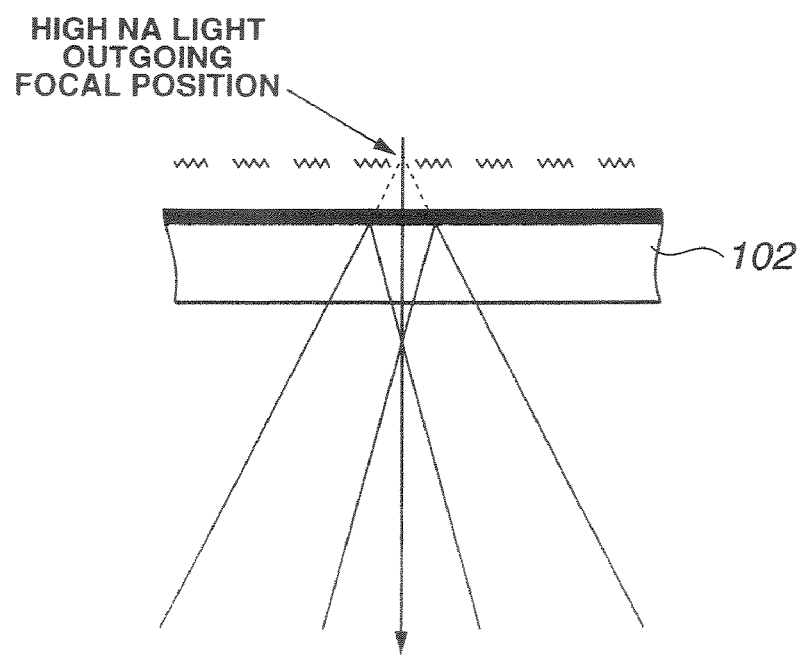
Figure 18:
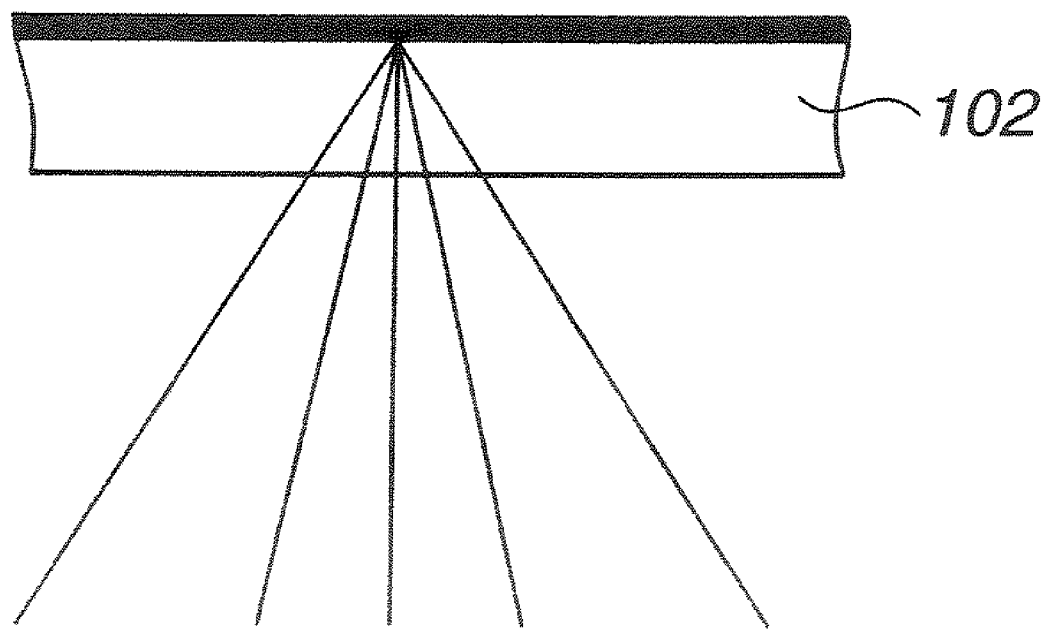
FIG. 18 is a side view showing the state of an incident beam and a reflected beam with respect to optical disc when spherical aberration and focus bias are in optimum state.

Here, the case where focus error signal becomes equal to zero in the state where quality of RF signal is best as shown in FIG. 18 will be considered. FIGS. 16A and 16B respectively show the state of a beam before reflection by the optical disc and the state of a beam after reflection by the optical disc in the case where aberration correction of (−) is carried out. In this case, in these FIGS. 16A, 16B and 18, and FIGS. 17A, 17B, 19A, 19B, 20A and 20B which will be described later, wavy lines indicate return light outgoing (emission) focal position where focus error signal is zero and quality of RF signal is best.

Namely, in the case where aberration correction of (−) is carried out, it looks that high NA light exists at the Near side with respect to in-focus position irrespective of the fact that the optical disc becomes more distant in practice (K>1) in the state where signal is best (Outgoing (Emission) focal point position of return light is located at the side close to the object lens (objective) with respect to the optimum state). Thus, in the focus error signal, there results that signal best point is shifted to the Near side. FIG. 16A shows the state of the beam before reflection, and FIG. 16B shows the state of the beam after reflection.

Further, FIGS. 17A and 17B respectively show the state of a beam before reflection by the optical disc and the state of a beam after reflection by the optical disc in the case where aberration correction of (+) is carried out. In the case where aberration correction of (+) is carried out, it looks that high NA light is located at the Far side with respect to in-focus position irrespective of the fact that the optical disc is near in practice (K>1) in the state where signal is best as shown in FIGS. 17A and 17B (Outgoing (Emission) focal point position of return light is located at the side far from the object lens (objective) with respect to the optimum state. Thus, in the focus error signal, there results the state where the signal best point is shifted to the Far side. FIG. 17A shows the state of the beam before reflection, and FIG. 17B shows the state of the beam after reflection.

This result indicates that different result is obtained in the system of detecting a focus error signal by a method in which the degree that the beam within aperture contribute to focus error signal is different, which is so called "astigmatism method" or "spot size method", etc.

Further, in practice, since there takes place change also in dependency upon what NA of return optical path which detects focus error signal is, or how divisional width of light detector is set if "spot size method" is employed, etc., it is desirable to suitably optimize value of K in accordance with respective designs.

As another example, in connection with the system where degrees of contribution with respect to focus error signal between high NA light and low NA light are the same, the incident beam and the reflected beam are shown in a model form in a manner similar to the above in FIGS. 19A, 19B, FIG. 20A and FIG. 20B. By taking into the consideration the fact that contributions with respect to focus error signal of high NA light and low NA light are the same, such state where high NA light and low NA light are symmetrical at the Near side or the Far side with respect to the outgoing (emission) focal point position where the focus error signal becomes equal to zero after reflection is assumed. When it is assumed that an aberration which becomes so after reflection is given before reflection, it is sufficient that movement quantity (shift quantity) of in-focus position of low NA light is caused to be greater, i.e., K>1.

Figure 19A:
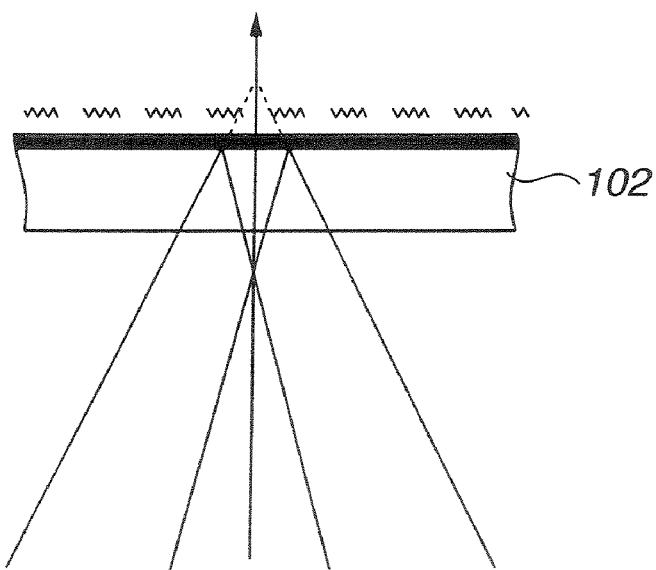
FIGS. 19A and 19B are side views showing an incident beam (FIG. 19A) and a reflected beam (FIG. 19B) with respect to optical disc when spherical aberration correction is carried out toward the (−) side in the system where degrees of contribution of high NA light and low NA light with respect to focus error signal are the same.
Figure 19B:
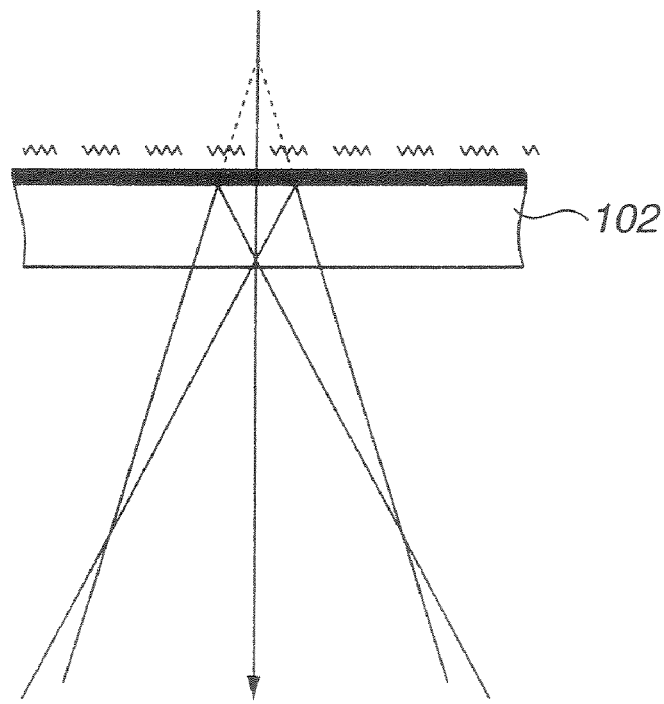
Figure 20A:
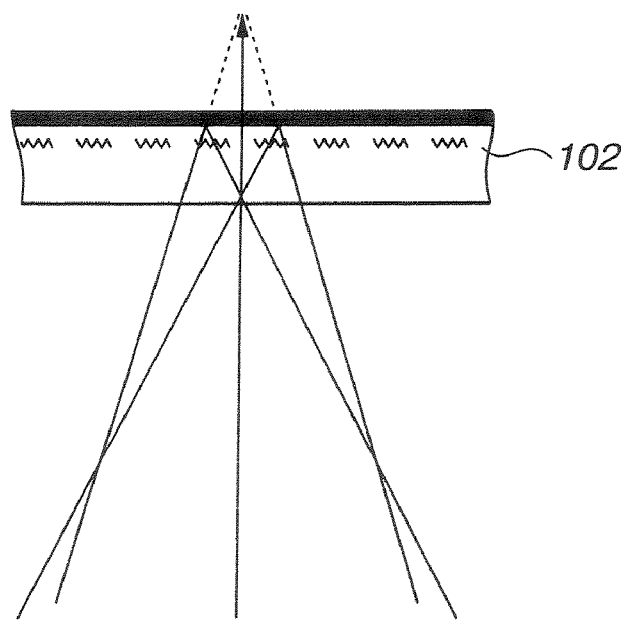
FIGS. 20A and 20B are side views showing the states of an incident beam (FIG. 20A) and a reflected beam (FIG. 20B) with respect to optical disc when spherical aberration correction is carried out toward the (+) side in the system where degrees of contribution of high NA light and low NA light with respect to focus error signal are the same.
Figure 20B:
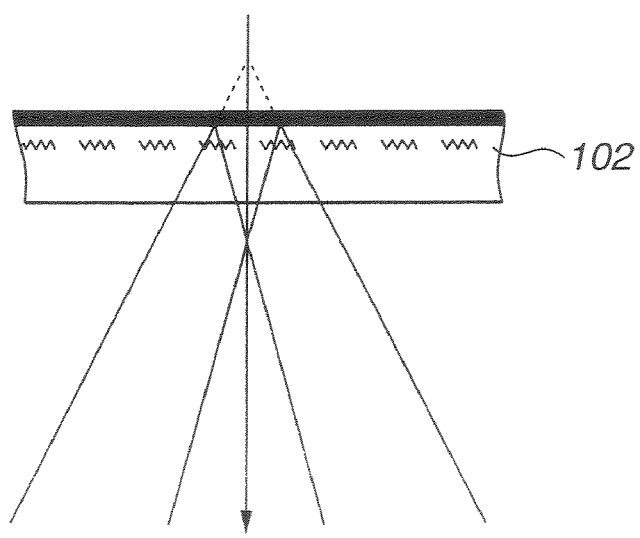

Additionally, FIG. 19A shows a beam before reflection by the optical disc 102 in the case where aberration correction of (−) is carried out, FIG. 19B shows a beam after reflection by the optical disc 102 in the case where aberration correction of (−) is carried out, FIG. 20A shows a beam before reflection by the optical disc 102 in the case where aberration correction of (+) is carried out, and FIG. 20B shows a beam after reflection by the optical disc 102 in the case where aberration correction of (+) is carried out.

Then, consideration will be made in connection with the case where switching is carried out between states where thickness of cover layer is greatly different like the case of optical disc of multi-layer recording, etc. In this case, since spherical aberration is corrected in optimum manner on the signal recording surface unlike the above-described case, K such that in-focus position of the beam which contributes to focus error signal is not changed as far as possible before and after correction is optimum K.

Figure 21A:
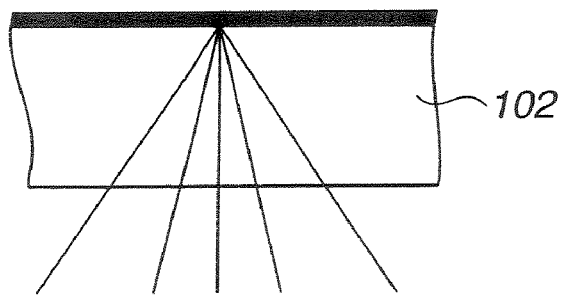
FIGS. 21A, 21B and 21C are side views showing the state of an incident beam with respect to optical disc when spherical aberration correction is carried out in the case where switching with respect to optical recording medium different in thickness of light transmission layer is carried out.
Figure 21B:
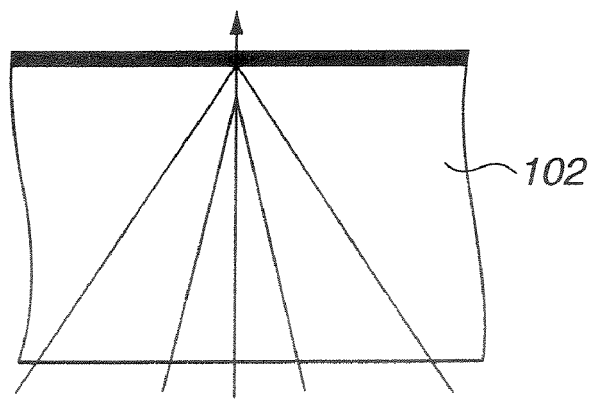
Figure 21C:
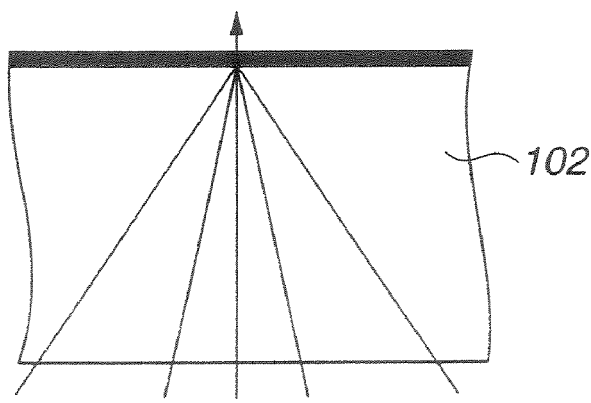

When consideration is made in connection with the case where a light detector having divided light receiving surfaces at the central portion shown in FIG. 15 is used, the beam which mainly contributes to focus error signal is the beam of the region where NA is high in this case. Accordingly, as shown in FIGS. 21A, 21B and 21C, such a pattern to correct deviation of in-focus position (spherical aberration) of the beam of the region where NA is low in the state where in-focus position of the beam of the region where NA is high is maintained is desirable. Namely, assuming that aberration is corrected in the state where the cover layer is thin as shown in FIG. 21A, when there results the state where cover layer is thick as shown in FIG. 21B, in-focus position of high NA light is far with respect to in-focus position of low NA light. At the time of correcting this, it is sufficient that in-focus position of low NA light is caused to be in correspondence with in-focus position of high NA light as shown in FIG. 21C.

Value of K which realizes this becomes about 1.25 as understood from the above-described "Figures of portions of values of K which maintain amplitude of the shortest mark" (FIGS. 13A, 13B and 13C).

Further, also in this case, value of optimum K varies by the system of detecting focus error signal. In addition, in the case where optimum spherical aberration correction pattern (i.e., value of K) is considered in a manner as described above, there are many cases in general where pattern which facilitates "optimization (adjustment) of correction quantity" with respect to a certain optical disc and pattern which does not change FOCUS BIAS in switching between multi-layers are not in correspondence with each other.

Then, consideration will be made in the following correction patterns with respect to the case where respective patterns which can be employed in the optical head in the best mode for carrying out this invention are adapted.

$$[\text{Correction pattern}] = A\{(-r^4) - K(-r^2)\}$$

As a pattern which can realize all K, the following four (pattern (A) to pattern (D)) are conceivable.

Pattern (A)
One surface: $A(-r^4)$
Other surface: $B(-r^2)$
Correction pattern:

$$A(-r^4) - B(-r^2) = A\{(-r^4) - (B/A)(-r^2)\}$$
$$= A\{(-r^4) - K(-r^2)\} \quad (\because B/A = K)$$

In this case, $K = B/A$.

Pattern (B)
One surface: $A(-r^4) - B1(-r^2)$
Other surface: $B2(-r^2)$
Correction pattern:

$$A(-r^4) - B1(-r^2) - B2(-r^2) = A(-r^4) - (B1 + B2)(-r^2)$$
$$= A(-r^4) - B(-r^2) \quad (\because B1 + B2 = B)$$
$$= A\{(-r^4) - (B/A)(-r^2)\}$$
$$= A\{(-r^4) - K(-r^2)\} \quad (\because B/A = K)$$

In this case, $K = B/A = (B1+B2)/A$.

Pattern (C)
One surface: $A1(-r^4) - B(-r^2)$
Other surface: $-A2(-r^4)$
Correction pattern $$A1(-r^4) - B(-r^2) + A2(-r^4) = (A1 + A2)(-r^4) - B(-r^2)$$
$$= A(-r^4) - B(-r^2) \quad (\because A1 + A2 = A)$$
$$= A\{(-r^4) - (B/A)(-r^2)\}$$
$$= A\{(-r^4) - K(-r^2)\} \quad (\because B/A = K)$$

In this case, $K=B/A=B/(A1+A2)$

Pattern (D)
One surface: $A1(-r^4)-B1(-r^2)$
Other surface: $-A2(-r^4)+B2(-r^2)$
Correction pattern:

$$A1(-r^4) - B1(-r^2) + A2(-r^4)B2(-r^2) = (A1+A2)(-r^4) - (B1+B2)(-r^2)$$
$$= A(-r^4) - B(-r^2)(\because A1+A2 = A)$$
$$(\because B1+B2 = B)$$
$$= A\{(-r^4) - (B/A)(-r^2)\}$$
$$= A\{(-r^4) - K(-r^2)\}(\because B/A = K)$$

In this case, $K=B/A=(B1+B2)/(A1+A2)$.

Further, as a pattern which can realize simple switching between two values of K, the following pattern (E) is conceivable.

Pattern (E), two surfaces are individually moved in the pattern (D) (when movement is carried out with respect to respective surfaces, movement is not carried out with respect to the other surface).

Further, as a pattern for carrying out adjustment into one K, the following pattern (F) is conceivable.

Pattern (F)
One surface: $A(-r^4)-B(-r^2)$
Other surface: fixed electrode (entire electrode)
Correction pattern:

$$A(-r^4) - B(-r^2) = A\{(-r^4) - (B/A)(-r^2)\}$$
$$= A\{(-r^4) - K(-r^2)\}(\because B/A = K)$$

In this case, $K=B/A$. Since A, B are variables with respect to the same electrode, K becomes fixed value.

Further, which the above-described patterns are respectively adapted with respect to the following four cases (case 1 to case 4) is indicated.

[Case 1] In the case where importance to only convenience of adjustment is attached without coping with multi-layer disc, etc., it is desirable to use pattern (F).

[Case 2] In the case where there is a desire to arbitrarily set value of K in a manner also including dispersion, etc., it is desirable to use either one of the pattern (A) to the pattern (D).

[Case 3] In the case where, e.g., two K are required for the purpose of adjustment and switching between plural recording layers, it is desirable to use pattern (D).

[Case 4] In the case where setting to only one K which becomes trade off of either adjustment or switching between plural recording layers, or both thereof is made by taking into consideration structure of the aberration correcting element and/or simplification of drive or control, it is desirable to use pattern (F).

In addition, this invention is not limited to the above-described best modes, but various applications and modifications are conceivable within the scope which does not depart from the gist of this invention.

As explained above, in accordance with the optical head of the best mode for carrying out this invention, aberration correcting element for controlling, by an arbitrary pattern, spherical aberration and defocus of the beam with respect to recording layer of optical recording medium is provided between the object lens and the light source. Thus, even in the case where there is used technique such as "high NA" or "multi-layer recording", etc. for high recording density or large recording capacity, it becomes possible to correct, in an optimum manner, with a simple technique, wave front aberration (mainly spherical aberration) produced thereby.

Further, in accordance with the optical apparatus of the best mode for carrying out this invention, aberration correcting element which controls, by an arbitrary pattern, spherical aberration and defocus of the beam with respect to the recording layer of the optical recording medium is provided between object lens of the optical head and the light source. Thus, even in the case where there is used technique such as "high NA" or "multi-layer recording", etc. for high recording density or large recording capacity, etc., it becomes possible to correct, in an optimum manner, with a simple technique, wave front aberration (mainly spherical aberration) produced thereby.

In addition, in accordance with the aberration correcting element of the best mode for carrying out this invention, when effective radius in a direction corresponding to the signal recording direction by the optical head is assumed to be r, phase distribution corresponding to phase distribution formula $A(-r^4)-B(-r^2)$ is generated with respect to variables A, B which satisfy $A \neq B$. Thus, even in the case where there is used technique such as "high NA", "multi-layer recording" for high recording density or large recording capacity, etc. in the optical head or the optical apparatus, it becomes possible to correct, in an optimum manner, with a simple technique, wave front aberration (mainly spherical aberration) produced thereby.

The invention claimed is:

1. An aberration correcting element disposed on an optical path within anoptical head and carrying out at least one of recording and reproduction of an information signal with respect to an optical recording medium including a light transmission layer on a recording layer where the information signal is recorded, the aberration correcting element comprising: a refractive index adjustment unit configured to adjust refractive index on the basis of applied voltage with an electrode for applying the voltage; electrodes, which make a pair, one at each side of the refractive index adjustment unit, wherein a transmitted beam is caused to generate phase distribution represented by the following phase distribution formula: phase distribution$(r)=A(-r^4)-B(-r^2)$ for each of the radius r, phase distribution corresponding to the $A(-r4)$ term in the phase distribution formula is generated by one electrode, and phase distribution corresponding to the $B(-r^2)$ term in the phase distribution formula is generated by the other electrode, when radius of beam spot of a beam converged onto the recording layer is assumed to be r, and variables different from each other are assumed to be A and B.

2. An aberration correcting element disposed on an optical path within an optical head and carrying out at least one of recording and reproduction of an information signal with respect to an optical recording medium including a light transmission layer on a recording layer where the information signal is recorded, the aberration correcting element comprising: a refractive index adjustment unit configured to adjust refractive index on the basis of applied voltage with an electrode for applying the voltage; electrodes, which make a pair, one at each side of the refractive index adjustment unit, a transmitted beam is caused to generate phase distribution represented by the following phase distribution formula: phase distribution$(r)=A(-r^4)-B(-r^2)$ for each of the radius r wherein when $B=B1B2$ is assumed in the phase distribution formula, phase distribution corresponding to $[A(-r^4)-B1(-r^2)]$ term is generated by one electrode, and phase distribution corresponding to $[B2(-r^2)]$ term in the phase distribution formula is generated by the other electrode, when radius of beam spot of a beam converged onto the recording layer is assumed to be r, and variables different from each other are assumed to be A and B.

3. An aberration correcting element disposed on an optical path within an optical head and carrying out at least one of recording and reproduction of an information signal with respect to an optical recording medium including a light transmission layer on a recording layer where the information signal is recorded, the aberration correcting element comprising: a refractive index adjustment unit configured to adjust refractive index on the basis of applied voltage with an electrode for applying the voltage; electrodes, which make a pair, one at each side of the refractive index adjustment unit, a transmitted beam is caused to generate phase distribution represented by the following phase distribution formula: phase distribution$(r)=A(-r^4)-B(-r^2)$ for each of the radius r wherein when $A=A1+A2$ is assumed in the phase distribution formula, phase distribution corresponding to $[A1(-r^4)-B(-r^2)]$ term is generated by one electrode, and phase distribution corresponding to $[-A2(-r^4)]$ term in the phase distribution formula is generated by the other electrode, when radius of beam spot of a beam converged onto the recording layer is assumed to be r, and variables different from each other are assumed to be A and B.

4. An aberration correcting element disposed on an optical path within an optical head and carrying out at least one of recording and reproduction of an information signal with respect to an optical recording medium including a light transmission layer on a recording layer where the information signal is recorded, the aberration correcting element comprising: a refractive index adjustment unit configured to adjust refractive index on the basis of applied voltage with an electrode for applying the voltage; electrodes, which make a pair, one at each side of the refractive index adjustment unit, a transmitted beam is caused to generate phase distribution represented by the following phase distribution formula: phase distribution$(r)=A(-r^4)-B(-R^2)$ for each of the radius r wherein when $A=A1+A2$ and $B=B1+B2$ are assumed in the phase distribution formula, phase distribution corresponding to $[A1(-r^4)-B1(-r^2)]$ term is generated by one electrode, and phase distribution corresponding to $[-A2(-r^4)+B2(-r^2)]$ term in the phase distribution formula is generated by the other electrode, when radius of beam spot of a beam converged onto the recording layer is assumed to be r, and variables different from each other are assumed to be A and B.

* * * * *